US010683015B2

(12) United States Patent
Boule et al.

(10) Patent No.: US 10,683,015 B2
(45) Date of Patent: Jun. 16, 2020

(54) DEVICE, METHOD, AND GRAPHICAL USER INTERFACE FOR PRESENTING VEHICULAR NOTIFICATIONS

(71) Applicant: Apple Inc., Cupertino, CA (US)

(72) Inventors: Andre Boule, San Jose, CA (US); Stephen Chick, Palo Alto, CA (US); Thomas R. Powell, San Francisco, CA (US); Emily Schubert, Los Gatos, CA (US)

(73) Assignee: APPLE INC., Cupertino, CA (US)

( * ) Notice: Subject to any disclaimer, the term of this patent is extended or adjusted under 35 U.S.C. 154(b) by 102 days.

(21) Appl. No.: 15/978,112

(22) Filed: May 12, 2018

(65) Prior Publication Data

US 2018/0334175 A1 Nov. 22, 2018

Related U.S. Application Data

(60) Provisional application No. 62/506,721, filed on May 16, 2017.

(51) Int. Cl.
*B60W 50/14* (2020.01)
*B63H 19/00* (2006.01)
(Continued)

(52) U.S. Cl.
CPC ............ *B60W 50/14* (2013.01); *B60W 40/08* (2013.01); *G05D 1/0088* (2013.01); *G06F 3/0488* (2013.01); *B60W 2040/0818* (2013.01); *B60W 2050/143* (2013.01); *B60W 2050/146* (2013.01); *G05D 2201/0213* (2013.01)

(58) Field of Classification Search
CPC ....... B60W 50/14; B63H 19/00; B62D 13/06; H04Q 7/22; G06F 3/0482; G06F 3/00; H04M 1/00; G08B 23/00
See application file for complete search history.

(56) References Cited

U.S. PATENT DOCUMENTS 9,185,526 B2 * 11/2015 Guba ...................... G08G 1/20
9,648,107 B1   5/2017 Penilla
(Continued)

OTHER PUBLICATIONS

International Preliminary Report on Patentability and Written Opinion for PCT/US2018/023489 dated Nov. 28, 2019.

*Primary Examiner* — Yuri Kan
(74) *Attorney, Agent, or Firm* — Fernando & Partners, LLP

(57) ABSTRACT

In accordance with some embodiments, a method is performed at a device with one or more processors, non-transitory memory, and a display. The method includes, while the device is in communication with an alert system integrated into a vehicle that is operating with at least a respective degree of autonomous control, displaying, on the display, a user interface that is unrelated to operating the vehicle. The device is a handheld device that is separate from the vehicle. The method includes, while displaying the user interface on the display, receiving, from the alert system integrated into the vehicle, an alert indication that a driver's attention is needed for operating the vehicle. The method includes, in response to receiving the alert indication, disabling at least a portion of the displayed user interface and displaying, on the display, a visual indication that the driver's attention is needed for operating the vehicle.

54 Claims, 27 Drawing Sheets

(51) Int. Cl.
    *B62D 13/06*         (2006.01)
    *H04M 1/00*         (2006.01)
    *B60W 40/08*        (2012.01)
    *G05D 1/00*         (2006.01)
    *G06F 3/0488*       (2013.01)

(56) References Cited

U.S. PATENT DOCUMENTS

| | | | | |
|---|---|---|---|---|
| 2006/0166656 | A1* | 7/2006 | Klicpera | H04W 4/029 |
| | | | | 455/414.3 |
| 2008/0082936 | A1* | 4/2008 | Helvick | G06F 9/451 |
| | | | | 715/779 |
| 2012/0001748 | A1* | 1/2012 | Ladouceur | H04M 1/72544 |
| | | | | 340/500 |
| 2014/0164932 | A1* | 6/2014 | Takatsudo | G08G 1/096883 |
| | | | | 715/733 |
| 2014/0277850 | A1* | 9/2014 | Jobs | B63H 19/00 |
| | | | | 701/2 |
| 2015/0375757 | A1 | 12/2015 | Schiek et al. | |
| 2016/0257341 | A1* | 9/2016 | Lavoie | B62D 13/06 |

\* cited by examiner

700

| At a device with one or more processors, non-transitory memory, a display: |
|---|
| While the device is in communication with an alert system integrated into a vehicle that is operating with at least a respective degree of autonomous control, displaying, on the display, a user interface that is unrelated to operating the vehicle, wherein the device is a handheld device that is separate from the vehicle —702 |

↓

While displaying the user interface on the display, receiving, from the alert system integrated into the vehicle, an alert indication that a driver's attention is needed for operating the vehicle —704

↓

Disabling at least a portion of the displayed user interface —706

Ignoring at least one user input received via one or more input devices of the device —708

Obscuring at least a portion of the display —710

Pausing content —712

Preventing one or more applications from a pre-defined set from executing —714

Disabling is based on the alert indication —716

Disabling is based on an application displayed in the user interface —718

DEVICE, METHOD, AND GRAPHICAL USER INTERFACE FOR PRESENTING VEHICULAR NOTIFICATIONS

RELATED APPLICATION

This application claims priority to U.S. Provisional Patent Application No. 62/506,721, filed on May 16, 2017, entitled "Device, Method, and Graphical User Interface for Presenting Vehicular Notifications," the entire contents of which are incorporated herein by reference.

TECHNICAL FIELD

This relates generally to electronic devices with touch-sensitive surfaces, including but not limited to electronic devices with touch-sensitive surfaces that present vehicular notifications.

BACKGROUND

In recent years, vehicles have been designed and manufactured that operate with various degrees of autonomous control (referred to as autonomous vehicles or semi-autonomous vehicles). A driver of such a vehicle may be tempted to employ a handheld device while the vehicle operates with a respective degree of autonomous control. However, in various circumstances, the driver may be required to assume control of the vehicle and such a transition may be frustrated if the driver's attention is directed towards the handheld device.

SUMMARY

Accordingly, there is a need for electronic devices with faster, more efficient methods and interfaces for presenting vehicular notifications from a vehicle operating with a respective degree of autonomous control. Such methods and interfaces optionally complement or replace conventional methods for presenting vehicular notifications. Such methods and interfaces reduce the cognitive burden on a user and produce a more efficient human-machine interface. For battery-operated devices, such methods and interfaces conserve power and increase the time between battery charges.

The above deficiencies and other problems associated with user interfaces for electronic devices with touch-sensitive surfaces are reduced or eliminated by the disclosed devices. In some embodiments, the device is a desktop computer. In some embodiments, the device is portable (e.g., a notebook computer, tablet computer, or handheld device). In some embodiments, the device has a touchpad. In some embodiments, the device has a touch-sensitive display (also known as a "touch screen" or "touch-screen display"). In some embodiments, the device has a graphical user interface (GUI), one or more processors, memory and one or more modules, programs or sets of instructions stored in the memory for performing multiple functions. In some embodiments, the user interacts with the GUI primarily through stylus and/or finger contacts and gestures on the touch-sensitive surface. In some embodiments, the functions optionally include image editing, drawing, presenting, word processing, website creating, disk authoring, spreadsheet making, game playing, telephoning, video conferencing, e-mailing, instant messaging, workout support, digital photographing, digital videoing, web browsing, digital music playing, and/or digital video playing. Executable instructions for performing these functions are, optionally, included in a non-transitory computer readable storage medium or other computer program product configured for execution by one or more processors.

In accordance with some embodiments, a method is performed at a device with one or more processors, non-transitory memory, a display, and an input device. The method includes: while the device is in communication with an alert system integrated into a vehicle that is operating with at least a respective degree of autonomous control, displaying, on the display, a user interface that is unrelated to operating the vehicle, wherein the device is a handheld device that is separate from the vehicle; while displaying the user interface on the display, receiving, from the alert system integrated into the vehicle, an alert indication that a driver's attention is needed for operating the vehicle; and, in response to receiving the alert indication, disabling at least a portion of the displayed user interface and displaying, on the display, a visual indication that the driver's attention is needed for operating the vehicle.

In accordance with some embodiments, an electronic device includes a display unit configured to display a user interface, one or more input units configured to receive user inputs, and a processing unit coupled with the display unit and the one or more input units. The processing unit is configured: while the device is in communication with an alert system integrated into a vehicle that is operating with at least a respective degree of autonomous control, display, on the display unit, a user interface that is unrelated to operating the vehicle; while displaying the user interface on the display unit, receive, from the alert system integrated into the vehicle, an alert indication that a driver's attention is needed for operating the vehicle; and, in response to receiving the alert indication, disable at least a portion of the displayed user interface and display, on the display unit, a visual indication that the driver's attention is needed for operating the vehicle.

In accordance with some embodiments, an electronic device includes a display, an input device, one or more processors, non-transitory memory, and one or more programs; the one or more programs are stored in the non-transitory memory and configured to be executed by the one or more processors and the one or more programs include instructions for performing or causing performance of the operations of any of the methods described herein. In accordance with some embodiments, a non-transitory computer readable storage medium has stored therein instructions which when executed by one or more processors of an electronic device with a display and an input device, cause the device to perform or cause performance of the operations of any of the methods described herein. In accordance with some embodiments, a graphical user interface on an electronic device with a display, an input device, a memory, and one or more processors to execute one or more programs stored in the non-transitory memory includes one or more of the elements displayed in any of the methods described above, which are updated in response to inputs, as described in any of the methods described herein. In accordance with some embodiments, an electronic device includes: a display, an input device; and means for performing or causing performance of the operations of any of the methods described herein. In accordance with some embodiments, an information processing apparatus, for use in an electronic device with a display and an input device, includes means for performing or causing performance of the operations of any of the methods described herein.

Thus, electronic devices with displays, touch-sensitive surfaces and optionally one or more sensors to detect intensity of contacts with the touch-sensitive surface are provided with faster, more efficient methods and interfaces for presenting vehicular notifications, thereby increasing the effectiveness, efficiency, and user satisfaction with such devices. Such methods and interfaces may complement or replace conventional methods for presenting vehicular notifications.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIGS. 7A-7C are flow diagrams illustrating a method of presenting vehicular notifications in accordance with some embodiments.

DESCRIPTION OF EMBODIMENTS

Drivers of vehicles operating with a respective degree of autonomous control can simultaneously operate a handheld device to consume content, e.g., by watching a movie, playing a game, or reading e-mail. However, in some circumstances, the driver's attention is needed to operate the vehicle. For example, in response to changing weather conditions, the vehicle may be unable to operate autonomously and require the driver's attention. As another example, in response to detecting an unusual road condition, such as police officer instructing vehicles to drive the wrong way on a street, the vehicle may be unable to operate autonomously and require the driver's attention.

When a driver is operating a handheld device, it may be difficult for the vehicle to obtain the driver's attention from the handheld device, but relatively easy for the handheld device to redirect the driver's attention to the vehicle. Accordingly, in embodiments described below, a user interface of a handheld device, in response to receiving an alert from the vehicle, displays a visual indication that the driver's attention is needed for operating the vehicle. In various implementations, the user interface is at least partially disabled in response to receiving the alert.

Figure 2:
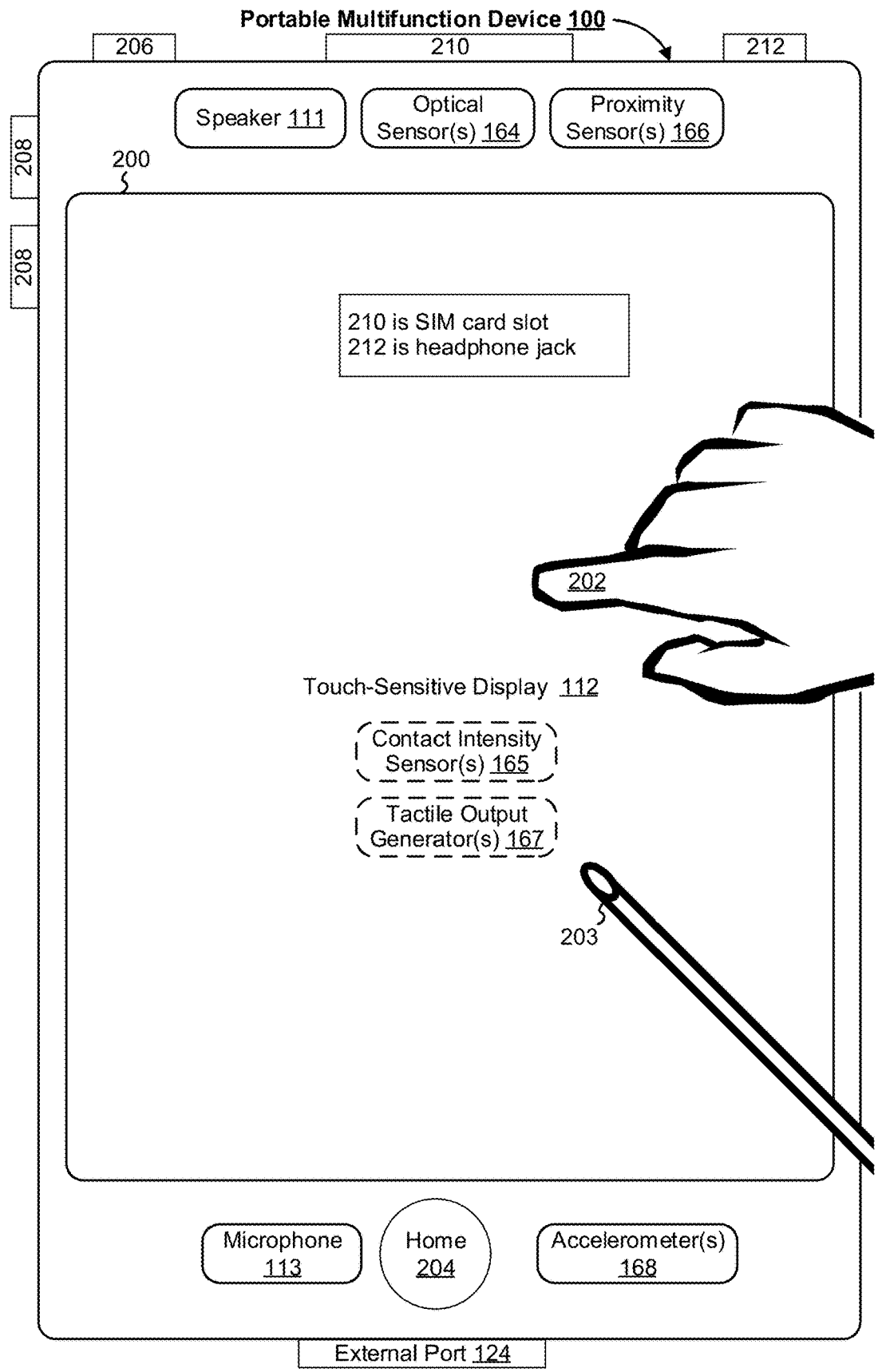
FIG. 2 illustrates a portable multifunction device having a touch screen in accordance with some embodiments.
Figure 3:
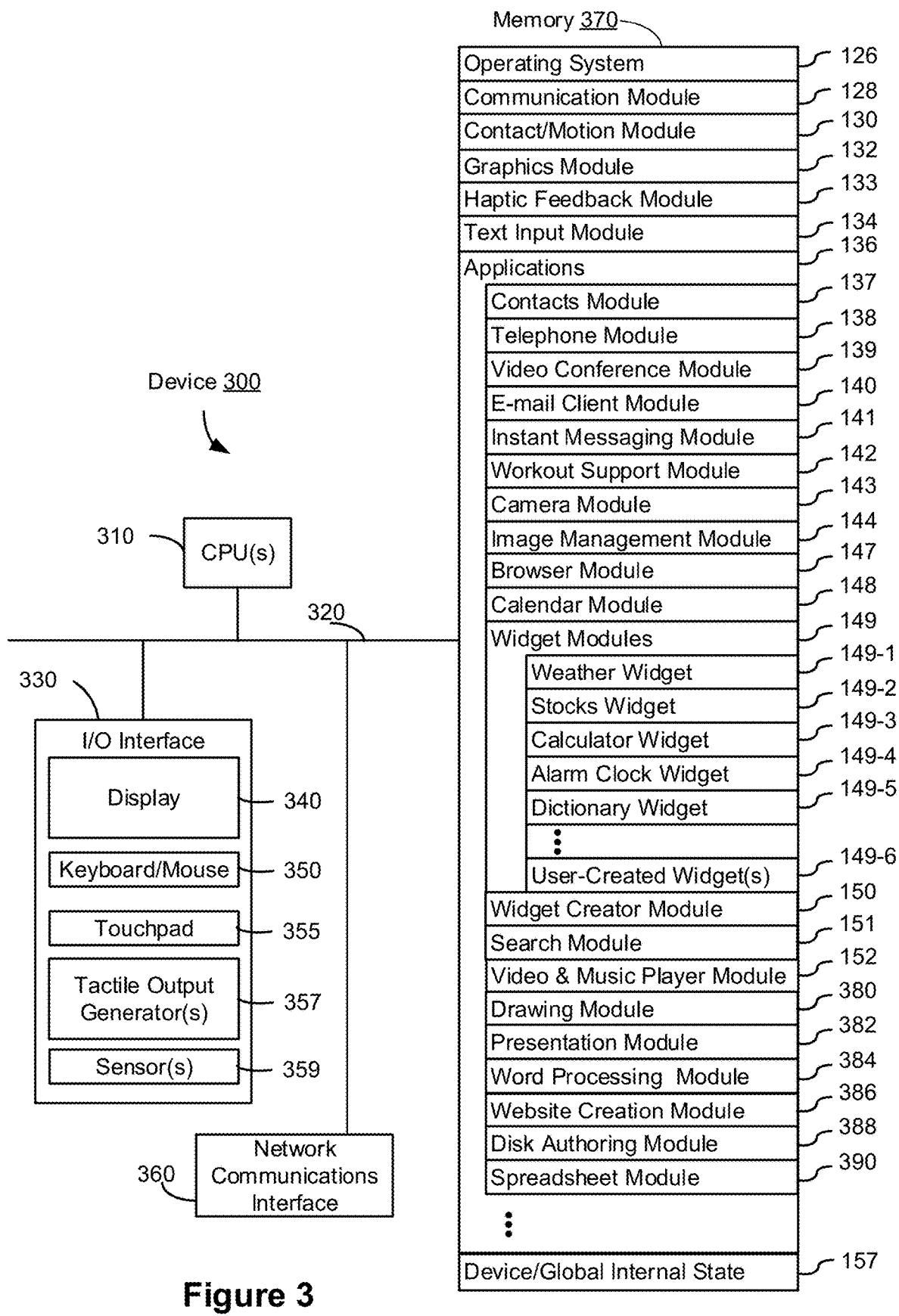
FIG. 3 is a block diagram of an example multifunction device with a display and a touch-sensitive surface in accordance with some embodiments.
Figure 4A:
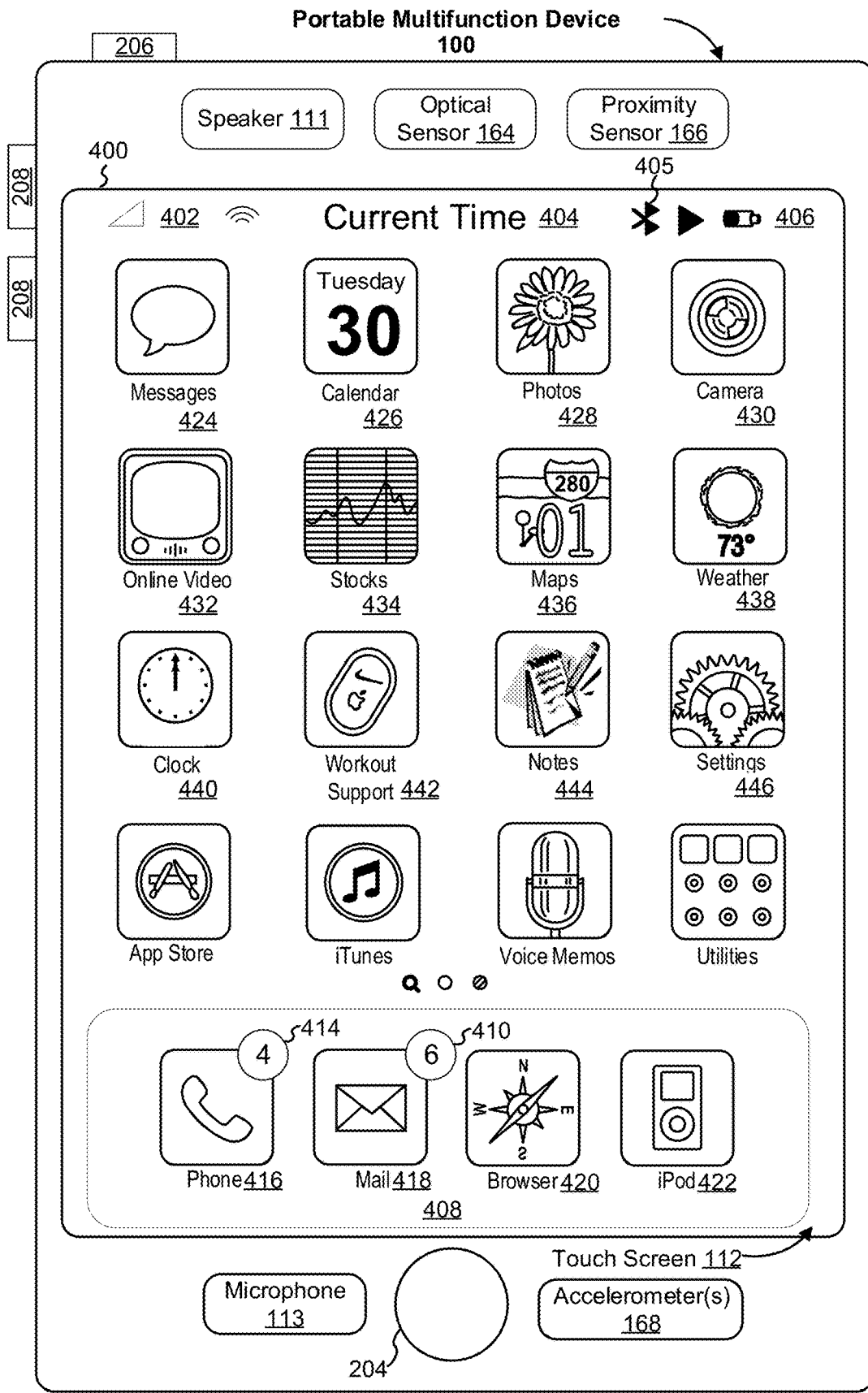
FIG. 4A illustrates an example user interface for a menu of applications on a portable multifunction device in accordance with some embodiments.
Figure 4B:
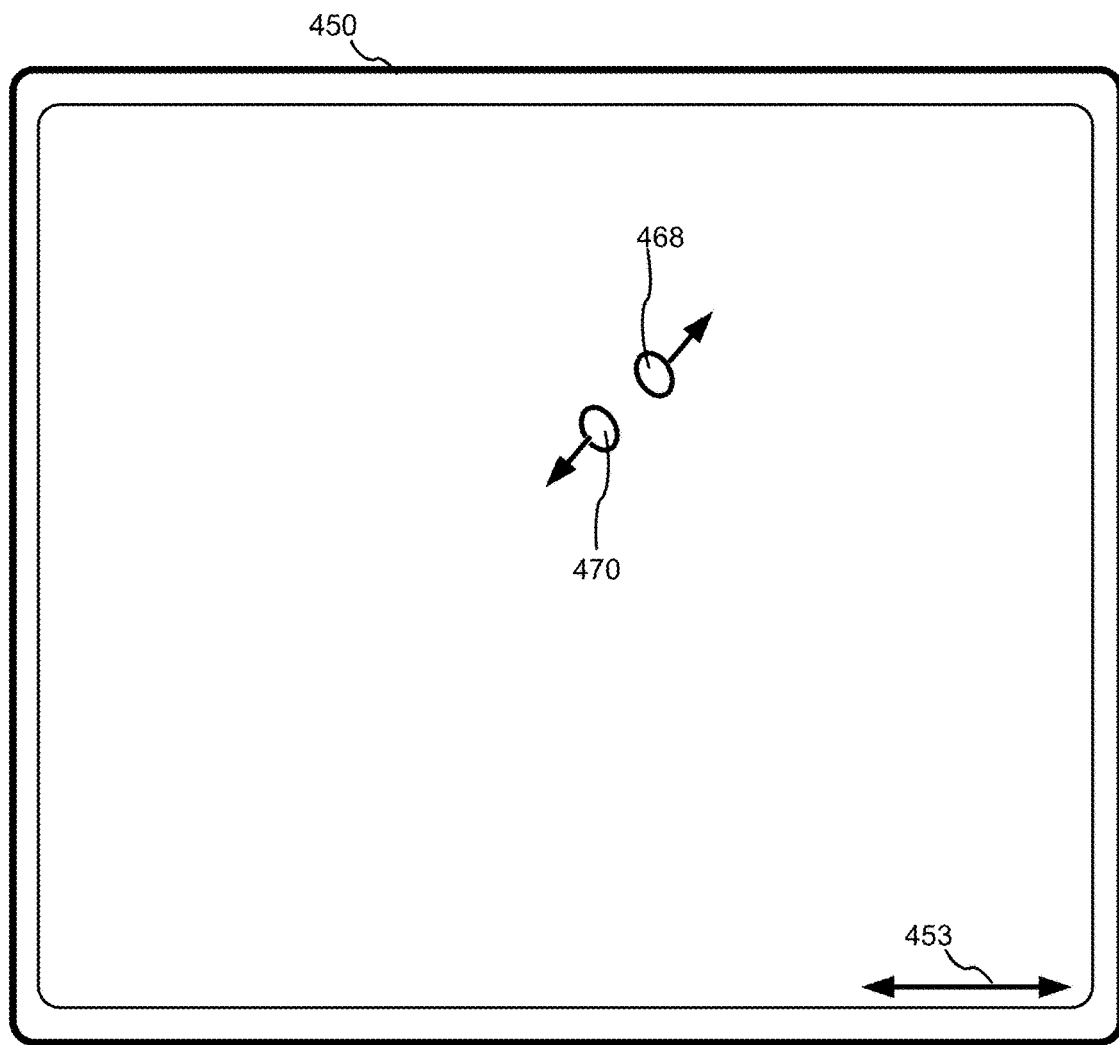
FIG. 4B illustrates an example user interface for a multifunction device with a touch-sensitive surface that is separate from the display in accordance with some embodiments.
Figure 4B:
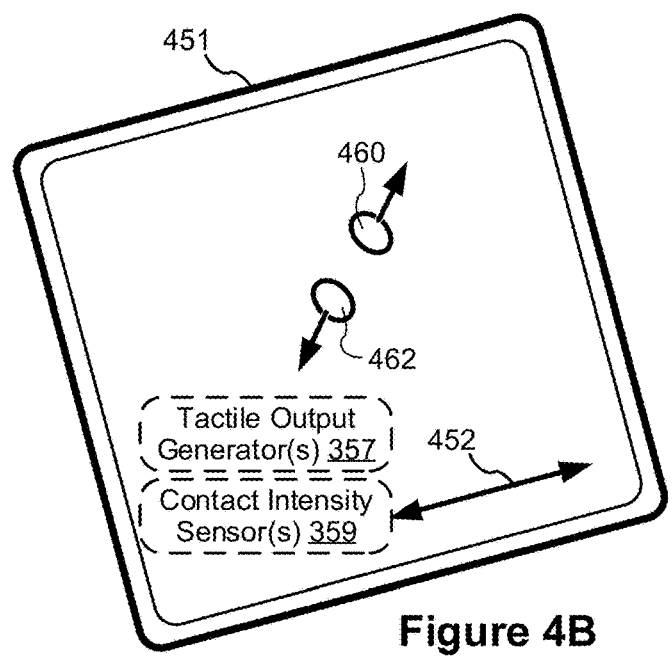
Figure 5:
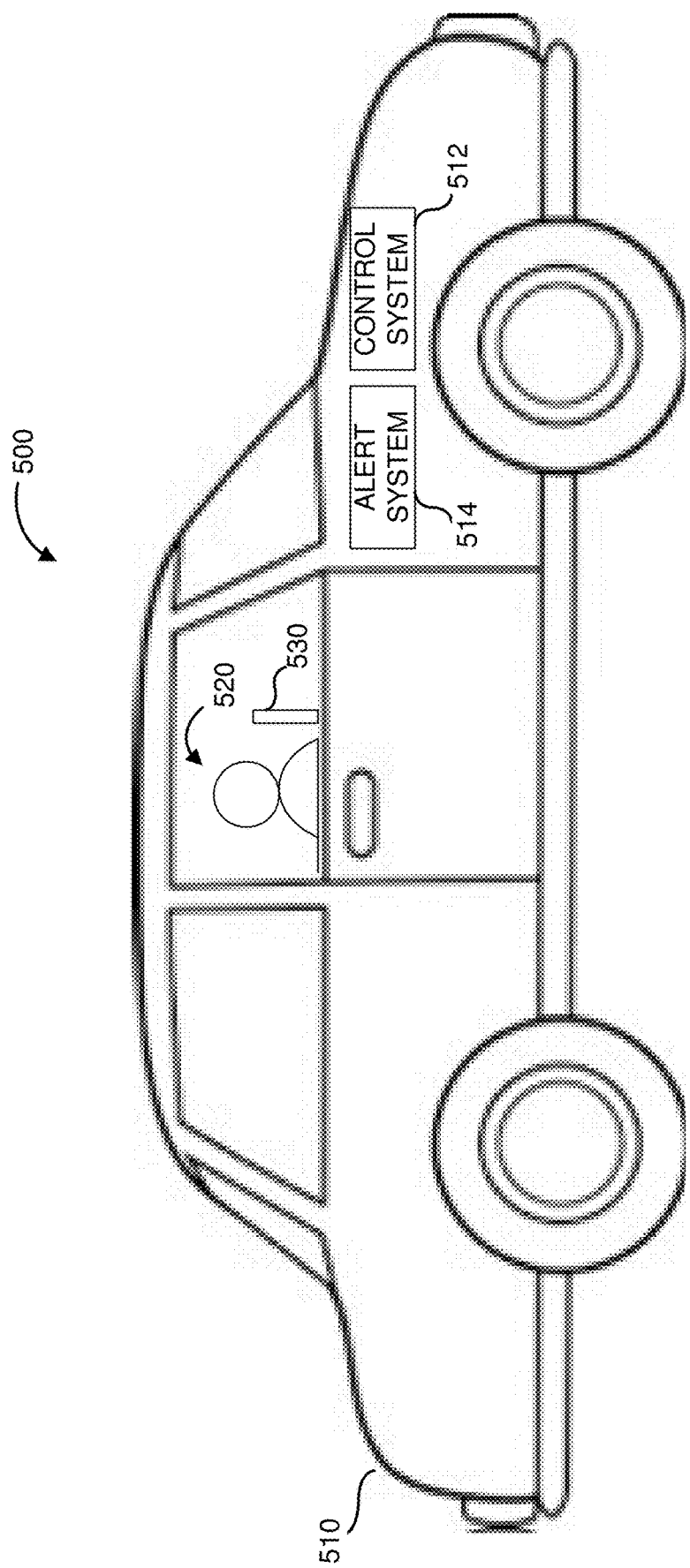
FIG. 5 illustrates an example vehicular environment in accordance with some embodiments.
Figure 6A:
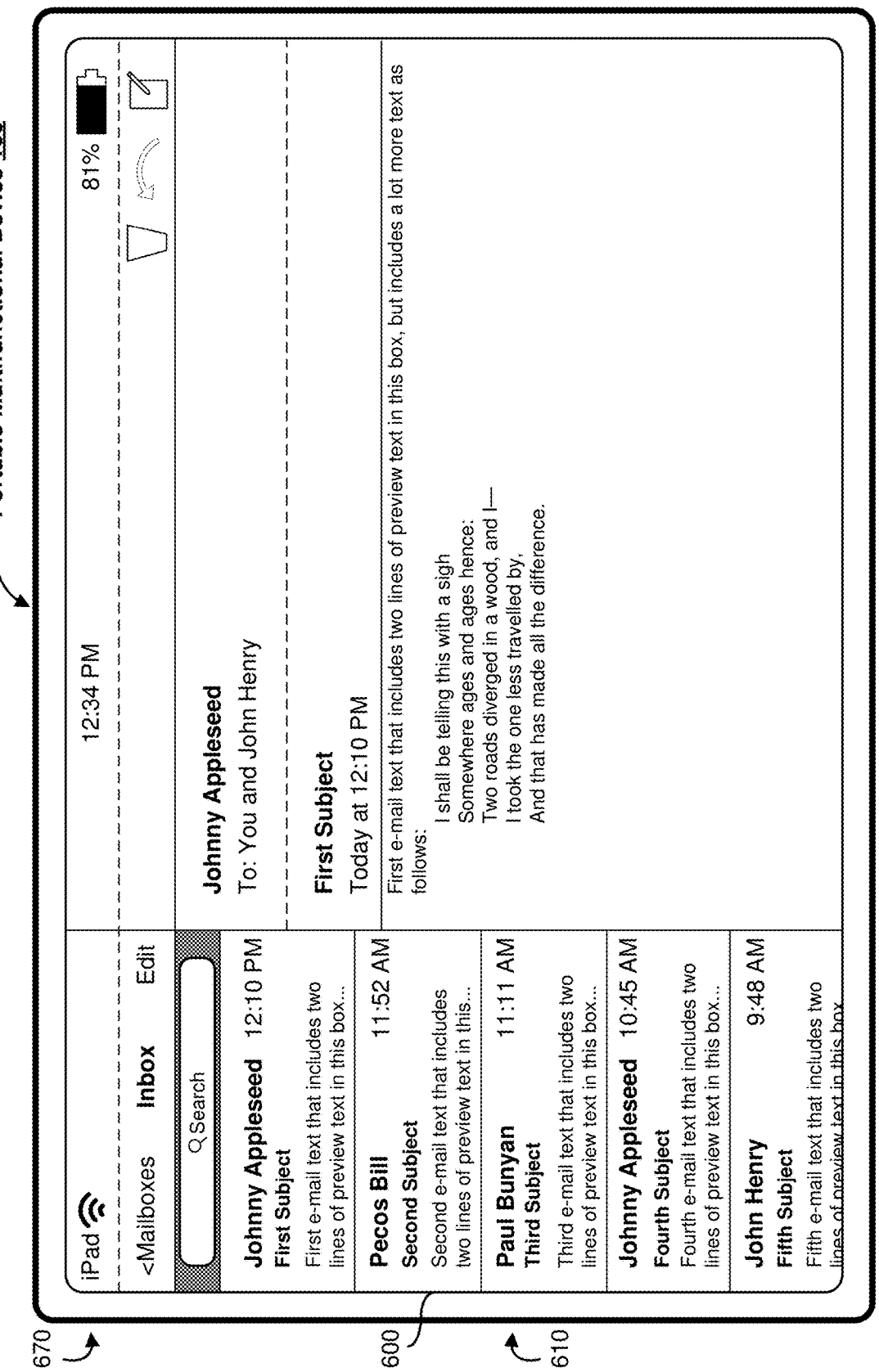
FIGS. 6A-6Q illustrate example user interfaces for presenting vehicular notifications in accordance with some embodiments.
Figure 6Q:
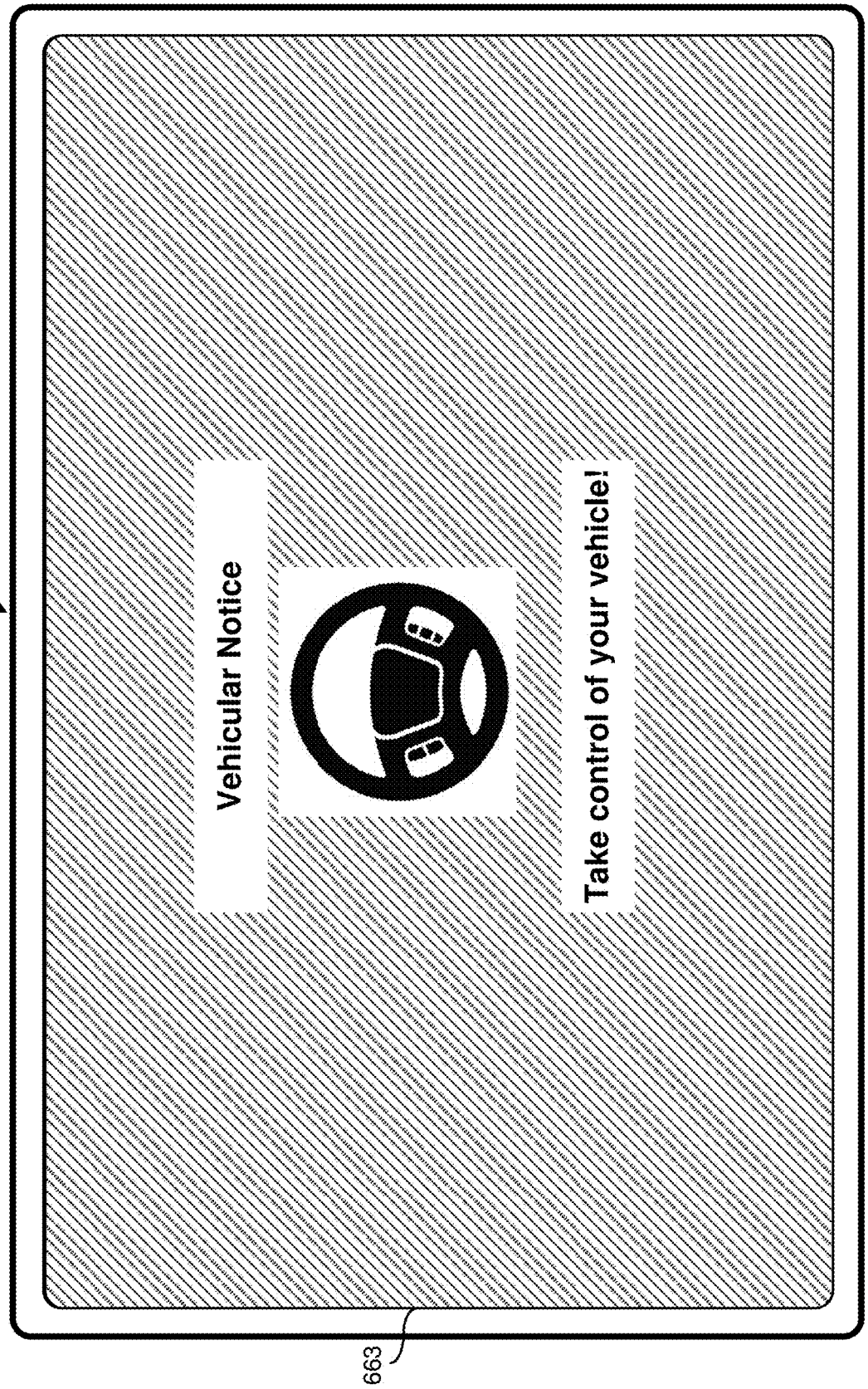
Figure 7B:
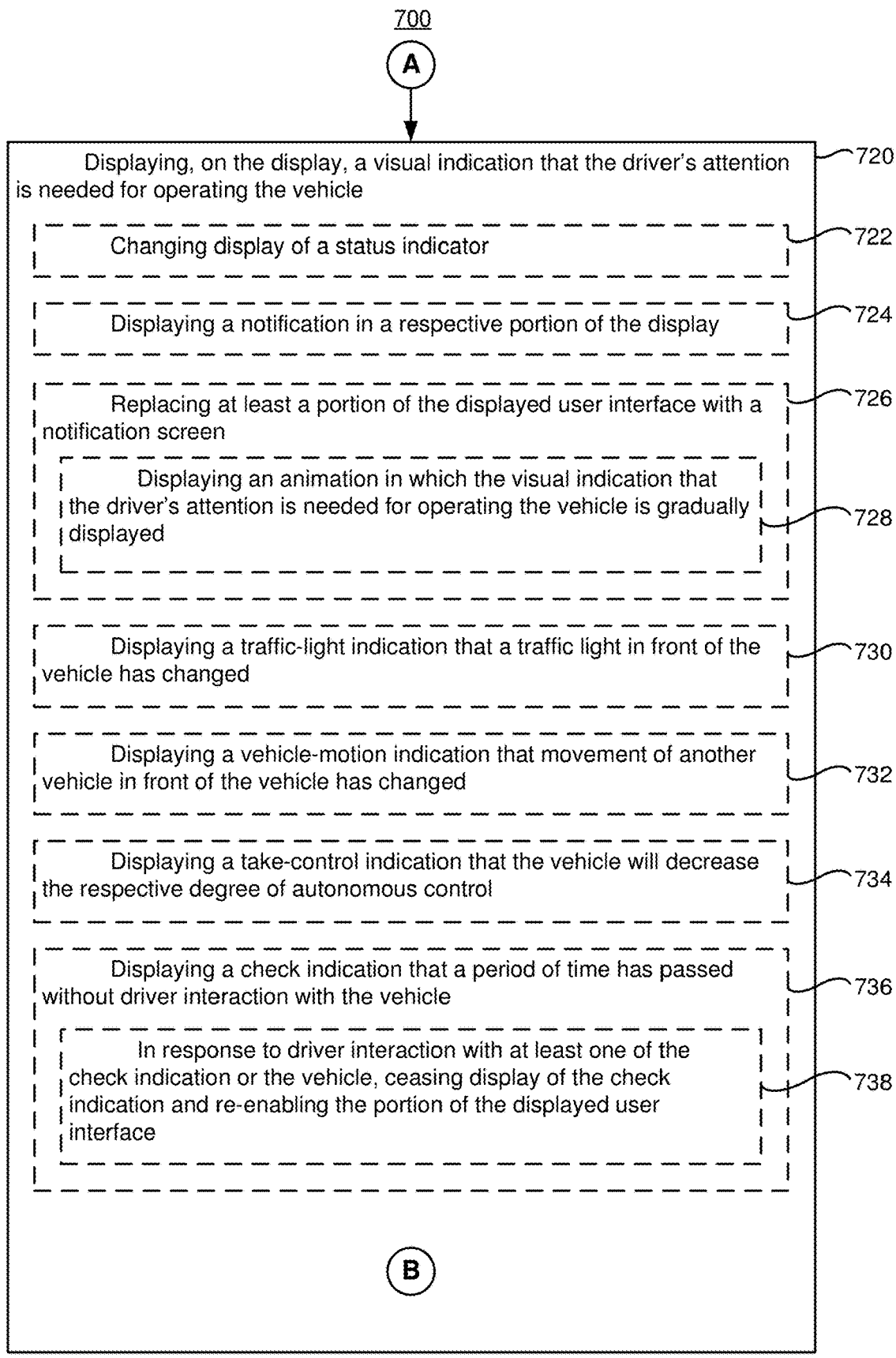
Figure 7C:
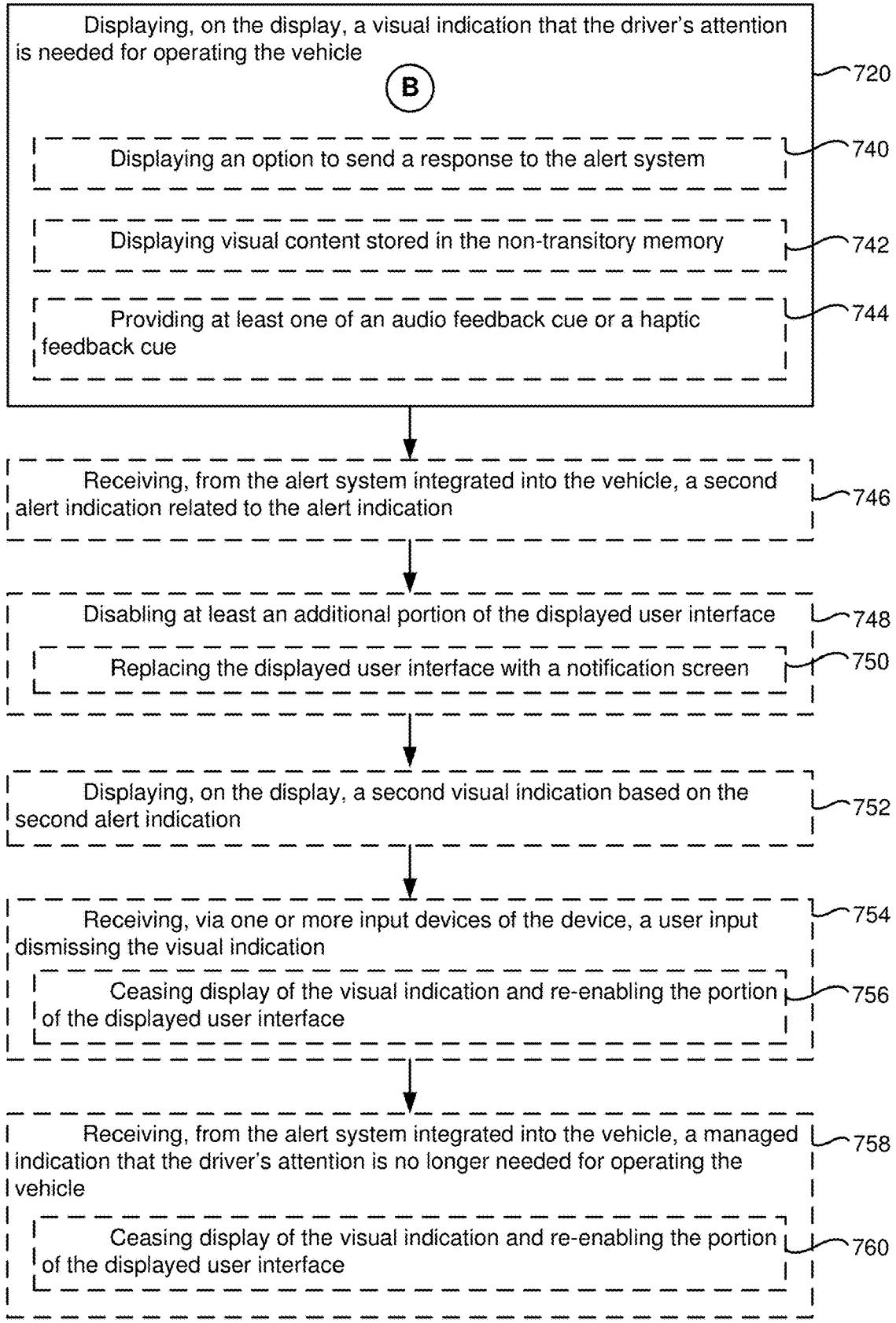

Below, FIGS. 1A-1B, 2, and 3 provide a description of example devices. FIGS. 4A-4B illustrate example user interfaces of an electronic device. FIG. 5 illustrates a vehicular environment. FIGS. 6A-6Q illustrate example user interfaces for presenting vehicular notifications. FIGS. 7A-7C illustrate a flow diagram of a method of presenting vehicular notifications. The user interfaces in FIGS. 6A-6Q are used to illustrate the processes in FIGS. 7A-7C.

EXAMPLE DEVICES

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact, unless the context clearly indicates otherwise.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Example embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch-screen displays and/or touchpads), are, optionally, used. It should also be understood that, in some embodiments, the device is not a portable communications device, but is a desktop computer with a touch-sensitive surface (e.g., a touch-screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
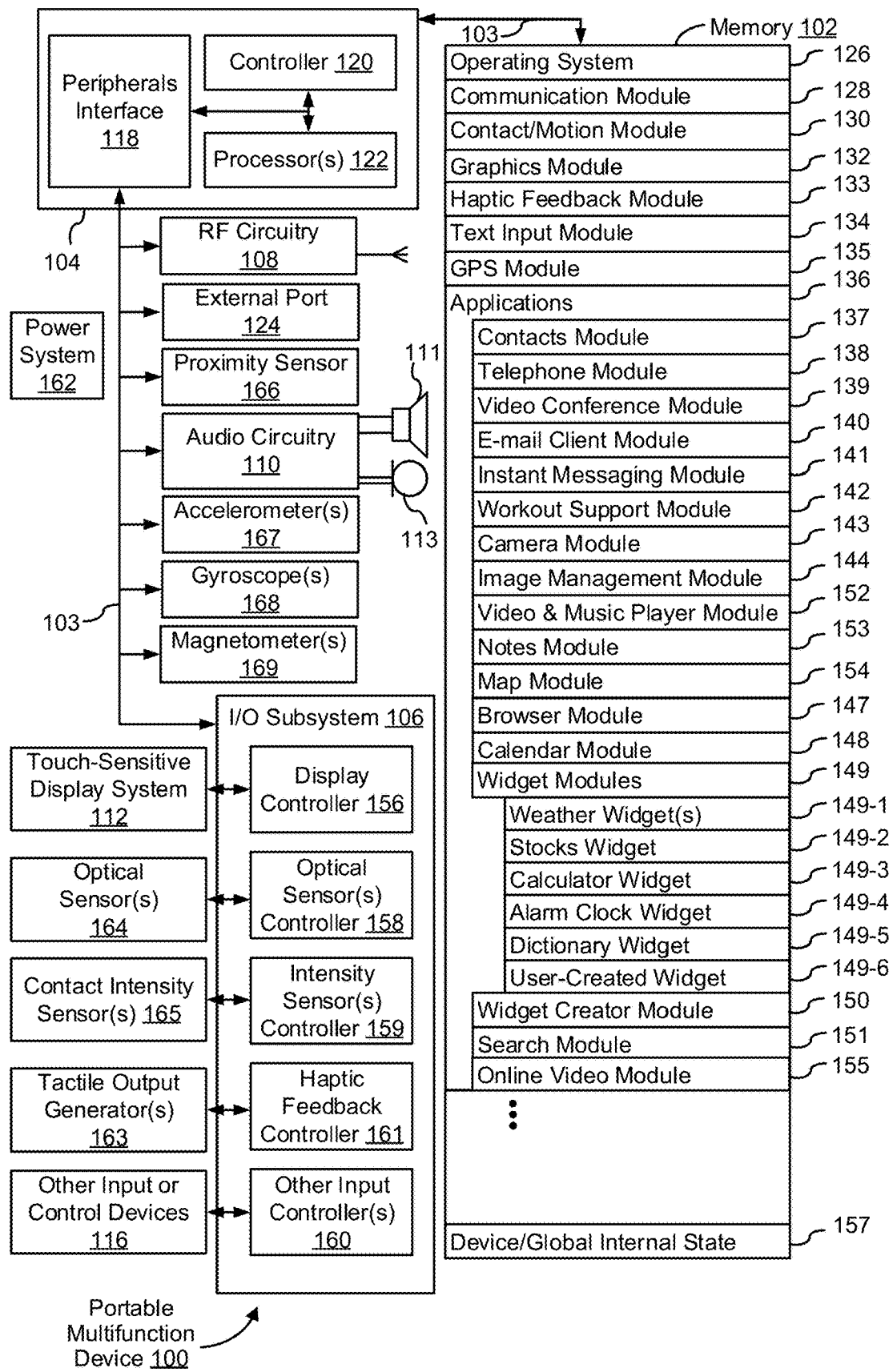
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display system 112 is sometimes called a "touch screen" for convenience, and is sometimes simply called a touch-sensitive display. Device 100 includes memory 102 (which optionally includes one or more computer readable storage mediums), memory controller 122, one or more processing units (CPUs) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more intensity sensors 165 for detecting intensity of contacts on device 100 (e.g., a touch-sensitive surface such as touch-sensitive display system 112 of device 100). Device 100 optionally includes one or more tactile output generators 163 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, firmware, or a combination thereof, including one or more signal processing and/or application specific integrated circuits.

Memory 102 optionally includes high-speed random access memory and optionally also includes non-volatile memory, such as one or more magnetic disk storage devices, flash memory devices, or other non-volatile solid-state memory devices. Access to memory 102 by other components of device 100, such as CPU(s) 120 and the peripherals interface 118, is, optionally, controlled by memory controller 122.

Peripherals interface 118 can be used to couple input and output peripherals of the device to CPU(s) 120 and memory 102. The one or more processors 120 run or execute various software programs and/or sets of instructions stored in memory 102 to perform various functions for device 100 and to process data.

In some embodiments, peripherals interface 118, CPU(s) 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch-sensitive display system 112 and other input or control devices 116, with peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input or control devices 116. The other input or control devices 116 optionally include physical buttons (e.g., push buttons, rocker buttons, etc.), dials, slider switches, joysticks, click wheels, and so forth. In some alternate embodiments, input controller(s) 160 are, optionally, coupled with any (or none) of the following: a keyboard, infrared port, USB port, stylus, and/or a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

Touch-sensitive display system 112 provides an input interface and an output interface between the device and a user. Display controller 156 receives and/or sends electrical signals from/to touch-sensitive display system 112. Touch-sensitive display system 112 displays visual output to the user. The visual output optionally includes graphics, text, icons, video, and any combination thereof (collectively termed "graphics"). In some embodiments, some or all of the visual output corresponds to user-interface objects.

Touch-sensitive display system 112 has a touch-sensitive surface, sensor or set of sensors that accepts input from the user based on haptic/tactile contact. Touch-sensitive display system 112 and display controller 156 (along with any associated modules and/or sets of instructions in memory 102) detect contact (and any movement or breaking of the contact) on touch-sensitive display system 112 and converts the detected contact into interaction with user-interface objects (e.g., one or more soft keys, icons, web pages or images) that are displayed on touch-sensitive display system 112. In an example embodiment, a point of contact between touch-sensitive display system 112 and the user corresponds to a finger of the user or a stylus.

Touch-sensitive display system 112 optionally uses LCD (liquid crystal display) technology, LPD (light emitting polymer display) technology, or LED (light emitting diode) technology, although other display technologies are used in other embodiments. Touch-sensitive display system 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch-sensitive display system 112. In an example embodiment, projected mutual capacitance sensing technology is used, such as that found in the iPhone®, iPod Touch®, and iPad® from Apple Inc. of Cupertino, Calif.

Touch-sensitive display system 112 optionally has a video resolution in excess of 100 dpi. In some embodiments, the touch screen video resolution is in excess of 400 dpi (e.g., 500 dpi, 800 dpi, or greater). The user optionally makes contact with touch-sensitive display system 112 using any suitable object or appendage, such as a stylus, a finger, and so forth. In some embodiments, the user interface is designed to work with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch-sensitive display system 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled with optical sensor controller 158 in I/O subsystem 106. Optical sensor(s) 164 optionally include charge-coupled device (CCD) or complementary metal-oxide semiconductor (CMOS) phototransistors. Optical sensor(s) 164 receive light from the environment, projected through one or more lens, and converts the light to data representing an image. In conjunction with imaging module 143 (also called a camera module), optical sensor(s) 164 optionally capture still images and/or video. In some embodiments, an optical sensor is located on the back of device 100, opposite touch-sensitive display system 112 on the front of the device, so that the touch screen is enabled for use as a viewfinder for still and/or video image acquisition. In some embodiments, another optical sensor is located on the front of the device so that the user's image is obtained (e.g., for selfies, for videoconferencing while the user views the other video conference participants on the touch screen, etc.).

Device 100 optionally also includes one or more contact intensity sensors 165. FIG. 1A shows a contact intensity sensor coupled with intensity sensor controller 159 in I/O subsystem 106. Contact intensity sensor(s) 165 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor(s) 165 receive contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch-screen display system 112 which is located on the front of device 100.

Device 100 optionally also includes one or more proximity sensors 166. FIG. 1A shows proximity sensor 166 coupled with peripherals interface 118. Alternately, proximity sensor 166 is coupled with input controller 160 in I/O subsystem 106. In some embodiments, the proximity sensor turns off and disables touch-sensitive display system 112 when the multifunction device is placed near the user's ear (e.g., when the user is making a phone call).

Device 100 optionally also includes one or more tactile output generators 163. FIG. 1A shows a tactile output generator coupled with haptic feedback controller 161 in I/O subsystem 106. Tactile output generator(s) 163 optionally include one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Tactile output generator(s) 163 receive tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch-sensitive display system 112, which is located on the front of device 100.

Device 100 optionally also includes one or more accelerometers 167, gyroscopes 168, and/or magnetometers 169 (e.g., as part of an inertial measurement unit (IMU)) for obtaining information concerning the position (e.g., attitude) of the device. FIG. 1A shows sensors 167, 168, and 169 coupled with peripherals interface 118. Alternately, sensors 167, 168, and 169 are, optionally, coupled with an input controller 160 in I/O subsystem 106. In some embodiments, information is displayed on the touch-screen display in a portrait view or a landscape view based on an analysis of data received from the one or more accelerometers. Device 100 optionally includes a GPS (or GLONASS or other global navigation system) receiver (not shown) for obtaining information concerning the location of device 100.

In some embodiments, the software components stored in memory 102 include operating system 126, communication module (or set of instructions) 128, contact/motion module (or set of instructions) 130, graphics module (or set of instructions) 132, haptic feedback module (or set of instructions) 133, text input module (or set of instructions) 134, Global Positioning System (GPS) module (or set of instructions) 135, and applications (or sets of instructions) 136. Furthermore, in some embodiments, memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch-sensitive display system 112; sensor state, including information obtained from the device's various sensors and other input or control devices 116; and location and/or positional information concerning the device's location and/or attitude.

Operating system 126 (e.g., iOS, Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used in some iPhone®, iPod Touch®, and iPad® devices from Apple Inc. of Cupertino, Calif. In some embodiments, the external port is a Lightning connector that is the same as, or similar to and/or compatible with the Lightning connector used in some iPhone®, iPod Touch®, and iPad® devices from Apple Inc. of Cupertino, Calif.

Contact/motion module 130 optionally detects contact with touch-sensitive display system 112 (in conjunction with display controller 156) and other touch-sensitive devices (e.g., a touchpad or physical click wheel). Contact/motion module 130 includes software components for performing various operations related to detection of contact (e.g., by a finger or by a stylus), such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts or stylus contacts) or to multiple simultaneous contacts (e.g., "multitouch"/multiple finger contacts and/or stylus contacts). In some embodiments, contact/motion module 130 and display controller 156 detect contact on a touchpad.

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event. Similarly, tap, swipe, drag, and other gestures are optionally detected for a stylus by detecting a particular contact pattern for the stylus.

Graphics module 132 includes various known software components for rendering and displaying graphics on touch-sensitive display system 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 163 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 optionally include the following modules (or sets of instructions), or a subset or superset thereof:
contacts module 137 (sometimes called an address book or contact list);
telephone module 138;
video conferencing module 139;
e-mail client module 140;
instant messaging (IM) module 141;
workout support module 142;
camera module 143 for still and/or video images;
image management module 144;
browser module 147;
calendar module 148;
widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
widget creator module 150 for making user-created widgets 149-6;
search module 151;
video and music player module 152, which is, optionally, made up of a video player module and a music player module;
notes module 153;
map module 154; and/or
online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch-sensitive display system 112, display controller 156, contact module 130, graphics module 132, and text input module 134, contacts module 137 includes executable instructions to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers and/or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch-sensitive display system 112, display controller 156, contact module 130, graphics module 132, and text input module 134, telephone module 138 includes executable instructions to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch-sensitive display system 112, display controller 156, optical sensor(s) 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch-sensitive display system 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch-sensitive display system 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, Apple Push Notification Service (APNs) or IMPS for Internet-based instant messages), to receive instant messages and to view received instant messages. In some embodiments, transmitted and/or received instant messages optionally include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, APNs, or IMPS).

In conjunction with RF circuitry 108, touch-sensitive display system 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (in sports devices and smart watches); receive workout sensor data; calibrate sensors used to monitor a workout; select and play music for a workout; and display, store and transmit workout data.

In conjunction with touch-sensitive display system 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, and/or delete a still image or video from memory 102.

In conjunction with touch-sensitive display system 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch-sensitive display system 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch-sensitive display system 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch-sensitive display system 112, display system controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch-sensitive display system 112, display system controller 156, contact module 130, graphics module 132, text input module 134, and browser module 147, the widget creator module 150 includes executable instructions to create widgets (e.g., turning a user-specified portion of a web page into a widget).

In conjunction with touch-sensitive display system 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch-sensitive display system 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch-sensitive display system 112, or on an external display connected wirelessly or via external port 124). In some embodiments, device 100 optionally includes the functionality of an MP3 player, such as an iPod (trademark of Apple Inc.).

In conjunction with touch-sensitive display system 112, display controller 156, contact module 130, graphics module 132, and text input module 134, notes module 153 includes executable instructions to create and manage notes, to do lists, and the like in accordance with user instructions.

In conjunction with RF circuitry 108, touch-sensitive display system 112, display system controller 156, contact module 130, graphics module 132, text input module 134, GPS module 135, and browser module 147, map module 154 includes executable instructions to receive, display, modify, and store maps and data associated with maps (e.g., driving directions; data on stores and other points of interest at or near a particular location; and other location-based data) in accordance with user instructions.

In conjunction with touch-sensitive display system 112, display system controller 156, contact module 130, graphics module 132, audio circuitry 110, speaker 111, RF circuitry 108, text input module 134, e-mail client module 140, and browser module 147, online video module 155 includes executable instructions that allow the user to access, browse, receive (e.g., by streaming and/or download), play back (e.g., on the touch screen 112, or on an external display connected wirelessly or via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
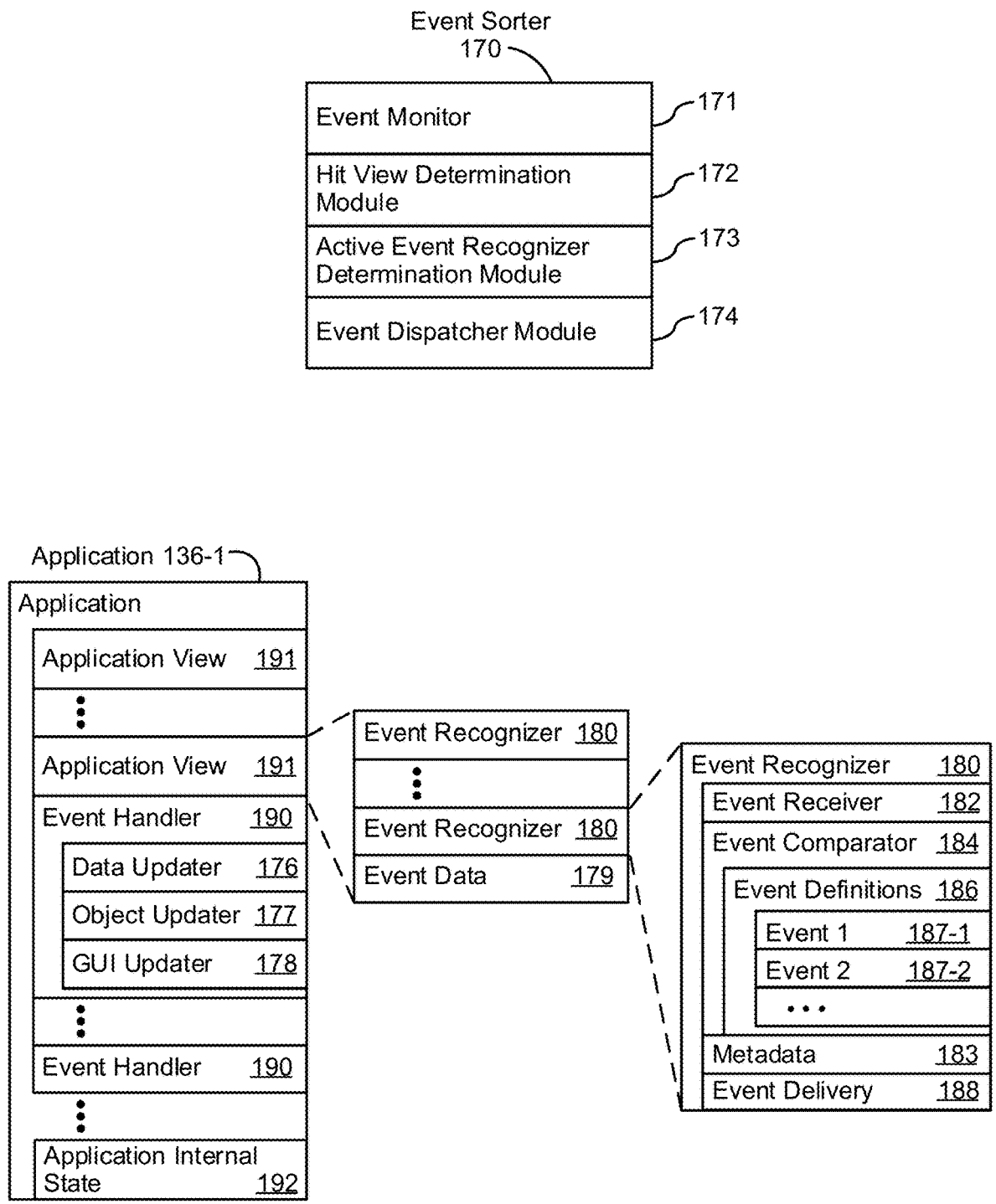
FIG. 1B is a block diagram illustrating example components for event handling in accordance with some embodiments.

FIG. 1B is a block diagram illustrating example components for event handling in accordance with some embodiments. In some embodiments, memory 102 (in FIGS. 1A) or 370 (FIG. 3) includes event sorter 170 (e.g., in operating system 126) and a respective application 136-1 (e.g., any of the aforementioned applications 136, 137-155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display system 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display system 112, as part of a multi-touch gesture). Peripherals interface 118 transmits information it receives from I/O subsystem 106 or a sensor, such as proximity sensor 166, accelerometer(s) 167, gyroscope(s) 168, magnetometer(s) 169, and/or microphone 113 (through audio circuitry 110). Information that peripherals interface 118 receives from I/O subsystem 106 includes information from touch-sensitive display system 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch-sensitive display system 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in a respective event, such as event 1 (187-1) or event 2 (187-2), include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display system 112, and lift-off of the touch (touch end). In some embodiments, the event also includes information for one or more associated event handlers 190.

In some embodiments, the event definition for a respective event, such as event 1 (187-1) or event 2 (187-2), includes a definition of an event for a respective user-interface object. In some embodiments, event comparator 184 performs a hit test to determine which user-interface object is associated with a sub-event. For example, in an application view in which three user-interface objects are displayed on touch-sensitive display system 112, when a touch is detected on touch-sensitive display system 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event, such as event 1 (187-1) or event 2 (187-2), also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the device; oral instructions; detected eye movements; biometric inputs; and/or any combination thereof are optionally utilized as inputs corresponding to sub-events which define an event to be recognized.

FIG. 2 illustrates a portable multifunction device 100 having a touch screen (e.g., touch-sensitive display system 112, FIG. 1A) in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As described previously, menu button 204 is, optionally, used to navigate to any application 136 in a set of applications that are, optionally executed on device 100. Alternatively, in some embodiments, the menu button is implemented as a soft key in a GUI displayed on the touch-screen display.

In some embodiments, device 100 includes the touch-screen display, menu button 204, push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In some embodiments, device 100 also accepts verbal input for activation or deactivation of some functions through microphone 113. Device 100 also, optionally, includes one or more contact intensity sensors 165 for detecting intensity of contacts on touch-sensitive display system 112 and/or one or more tactile output generators 163 for generating tactile outputs for a user of device 100.

FIG. 3 is a block diagram of an example multifunction device with a display and a touch-sensitive surface in accordance with some embodiments. Device 300 need not be portable. In some embodiments, device 300 is a laptop computer, a desktop computer, a tablet computer, a multi-media player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch-screen display. I/O interface 330 also optionally includes a keyboard and/or mouse (or other pointing device) 350 and touchpad 355, tactile output generator 357 for generating tactile outputs on device 300 (e.g., similar to tactile output generator(s) 163 described above with reference to FIG. 1A), sensors 359 (e.g., touch-sensitive, optical, contact intensity, proximity, acceleration, attitude, and/or magnetic sensors similar to sensors 112, 164, 165, 166, 167, 168, and 169 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above identified elements in FIG. 3 are, optionally, stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Attention is now directed towards embodiments of user interfaces ("UI") that are, optionally, implemented on portable multifunction device 100.

FIG. 4A illustrates an example user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser"; and
  Icon 422 for video and music player module 152, also referred to as iPod (trademark of Apple Inc.) module 152, labeled "iPod"; and
Icons for other applications, such as:
  Icon 424 for IM module 141, labeled "Text";
  Icon 426 for calendar module 148, labeled "Calendar";
  Icon 428 for image management module 144, labeled "Photos";
  Icon 430 for camera module 143, labeled "Camera";
  Icon 432 for online video module 155, labeled "Online Video";
  Icon 434 for stocks widget 149-2, labeled "Stocks";
  Icon 436 for map module 154, labeled "Map";
  Icon 438 for weather widget 149-1, labeled "Weather";
  Icon 440 for alarm clock widget 169-6, labeled "Clock";
  Icon 442 for workout support module 142, labeled "Workout Support";
  Icon 444 for notes module 153, labeled "Notes"; and
  Icon 446 for a settings application or module, which provides access to settings for device 100 and its various applications 136.

It should be noted that the icon labels illustrated in FIG. 4A are merely examples. For example, in some embodiments, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an example user interface on a device (e.g., device 300, FIG. 3) with a touch-sensitive surface 451 (e.g., a tablet or touchpad 355, FIG. 3) that is separate from the display 450. Device 300 also, optionally, includes one or more contact intensity sensors (e.g., one or more of sensors 359) for detecting intensity of contacts on touch-sensitive surface 451 and/or one or more tactile output generators 359 for generating tactile outputs for a user of device 300.

FIG. 4B illustrates an example user interface on a device (e.g., device 300, FIG. 3) with a touch-sensitive surface 451 (e.g., a tablet or touchpad 355, FIG. 3) that is separate from the display 450. Although many of the examples that follow will be given with reference to inputs on touch screen display 112 (where the touch sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures, etc.), it should be understood that, in some embodiments, one or more of the finger inputs are replaced with input from another input device (e.g., a mouse based input or a stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

VEHICULAR ENVIRONMENT

FIG. 5 illustrates an example vehicular environment 500 in accordance with some embodiments. The vehicular environment 500 includes a vehicle 510, a driver 520, and a handheld device 530. In various implementations, the handheld device 530 is a phone, tablet, or laptop computer. In various implementations, the handheld device 530 corresponds to the portable multifunctional device 100 of FIG. 4A.

The vehicle 510 includes a control system 512 that allows the vehicle to operate with at least a respective degree of autonomous control. To that end, in various implementations, the control system 512 includes (or is in electronic communication with) various sensors, such as proximity sensors and/or cameras, and uses the produced data to control one or more of the throttle, brakes, and steering of the vehicle 510.

SAE International (originally established as the Society of Automotive Engineers) has produced definitions for levels of automation as follows. At SAE Level 0, the human driver does everything. At SAE Level 1, an automated system on the vehicle can sometimes assist the human driver conduct some parts of the driving task. For example, a vehicle, upon detecting an obstruction in front of the vehicle, further apply brakes the driver has applied. At SAE Level 2, an automated system on the vehicle can actually conduct some parts of the driving task, while the human continues to monitor the driving environment and performs the rest of the driving task. For example, a vehicle travelling on a highway can maintain a fixed speed while the driver controls the steering of the vehicle to maintain the vehicle within a lane. At SAE Level 3, an automated system can both actually conduct some parts of the driving task and monitor the driving environment in some instances, but the human driver must be ready to take back control when the automated system requests. For example, a vehicle travelling on a highway can maintain itself within a lane and at a safe distance between another vehicle. However, in some circumstances, the driver may be required to take control of the vehicle, such as when the other vehicle departs the lane. At SAE Level 4, an automated system can conduct the driving task and monitor the driving environment, and the human need not take back control, but the automated system can operate only in certain environments and under certain conditions. For example, the vehicle can navigate through an urban environment, but only in daytime or fair weather conditions. At SAE Level 5, the automated system can perform all driving tasks, under all conditions that a human driver could perform them.

In various implementations, the control system 512 is configured to operate the vehicle 510 at SAE Level 1 or greater. In various implementations, the control system 512 is configured to operate the vehicle 510 at SAE Level 3 or greater.

As operation of the vehicle 510 is at least partially automated, the driver 520 can use the handheld device 530 to perform tasks unrelated to operation of the vehicle 510, such as check e-mail, watch movies, or play games. However, as noted above, in various circumstances, a human driver must be ready to take back control when the automated system requests. To that end, an alert system 512 is integrated into the vehicle 510 and generates alert indications that the driver's attention is needed for operating the vehicle 510. The alert system 512 transmits the alert indications to the handheld device 530. Thus the handheld device 530 receives alert indications from the alert system 512 integrated into the vehicle 510. In response, the handheld device 530 displays a visual indication that the driver's attention is needed for operating the vehicle 510.

USER INTERFACES AND ASSOCIATED PROCESSES

Attention is now directed towards embodiments of user interfaces ("UI") and associated processes that may be implemented on an electronic device (such as portable multifunction device (PMD) 100, device 300, or handheld device 530) with a display and a touch-sensitive surface.

FIGS. 6A-6Q illustrate example user interfaces for presenting vehicular notifications in accordance with some embodiments. The user interfaces in these figures are used to illustrate the processes described below, including the processes in FIGS. 7A-7C. Although some of the examples which follow will be given with reference to inputs on a touch-screen display (where the touch-sensitive surface and the display are combined), in some embodiments, the device detects inputs on a touch-sensitive surface 451 that is separate from the display 450, as shown in FIG. 4B.

FIG. 6A illustrates a user interface 600 displayed by a portable multifunctional device 100. The user interface 600 includes device bar 670 and, below the device bar 670, an application region 610 including an e-mail user interface of an e-mail application. The device bar 670 at the top of the display including an identifier of the portable multifunctional device 100 (e.g., "iPad"), a wireless connection indicator, a current time, and a battery indicator indicating a charge level of the portable multifunctional device 100.

Figure 6B:
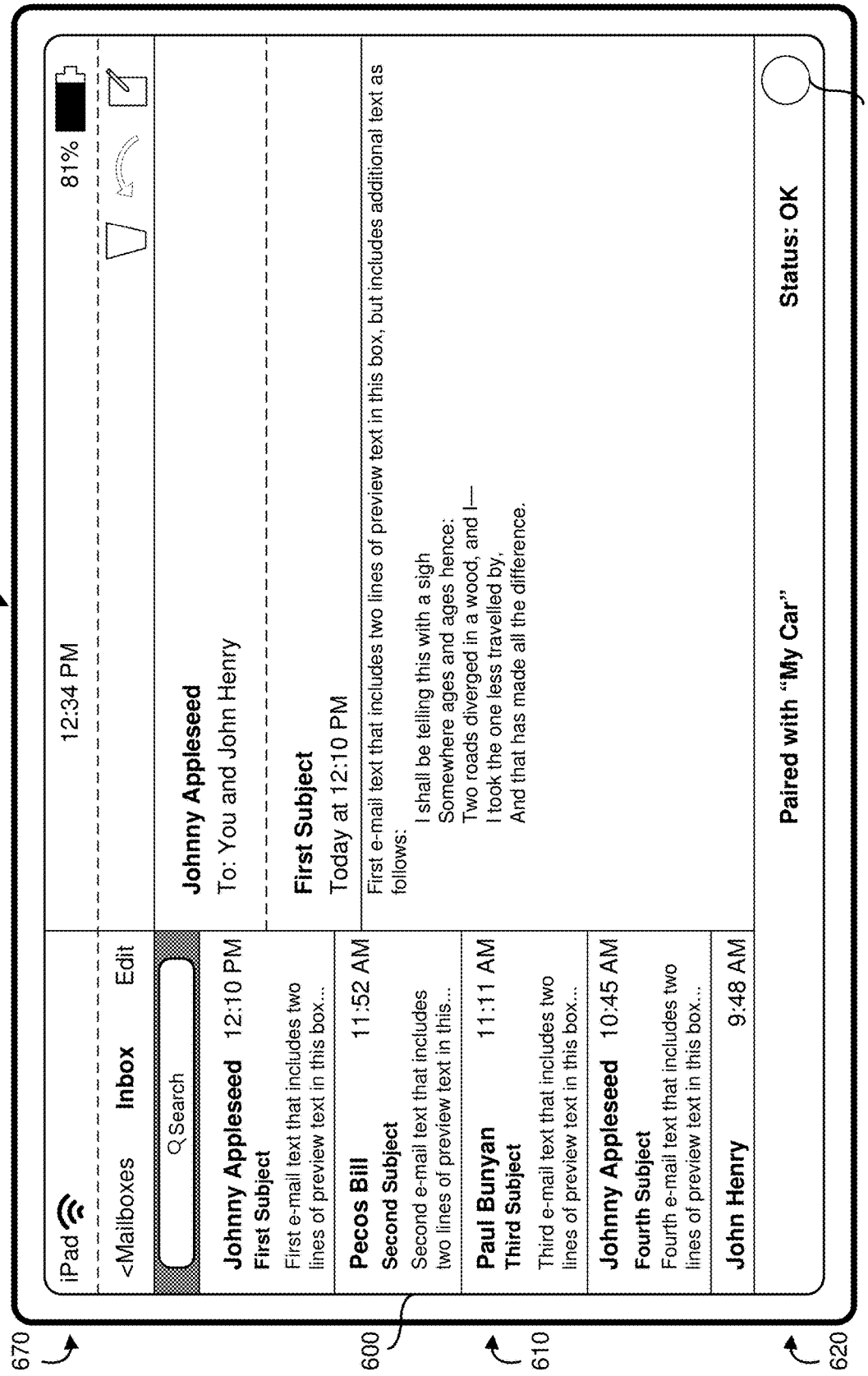

FIG. 6B illustrates the user interface 600 when the portable multifunctional device 100 is in a vehicle, such as the vehicle 510 of FIG. 5, in some embodiments. The user interface 600 includes a vehicular status bar 620 indicating that the portable multifunctional device 100 is in electronic communication with the vehicle. Thus, when the portable multifunctional device 100 is in the vehicle, the vehicular status bar 620 is a persistent visual indication displayed to communicate to the user that the device is in the vehicle.

The vehicular status bar 620 includes a status indicator 621 that provides information regarding the status of the vehicle. In FIG. 6B, the status indicator 621 indicates that the driver's attention is not needed to operate the vehicle.

Figure 6C:
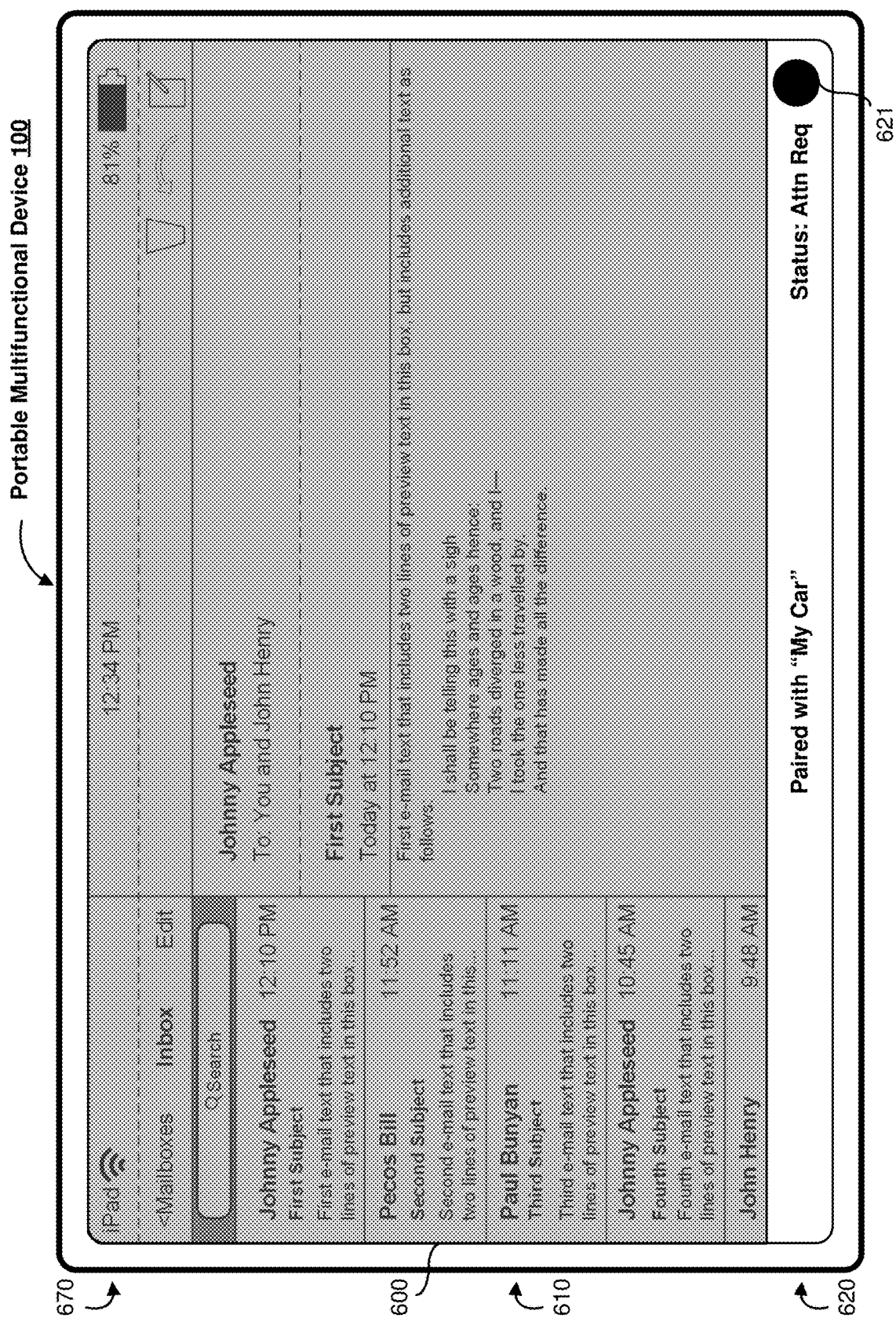

FIG. 6C illustrates the user interface 600 of FIG. 6B in response to receiving an alert indication that a driver's attention is needed for operating the vehicle. In response to receiving the alert indication, the status indicator 621 is changed to indicate that the driver's attention is needed for operating the vehicle. In various implementations, the status indicator is changed from a first color to a second color (e.g., from green to red).

Further, in response to receiving the alert indication, at least a portion of the user interface 600 is disabled. In particular, the device bar 670 and the application region 610 are obscured (e.g., blurred or dimmed). In various implementations, user input received at locations of the application region 610 are ignored by the portable multifunctional device 100 when the portion of the user interface 600 is disabled.

Figure 6D:
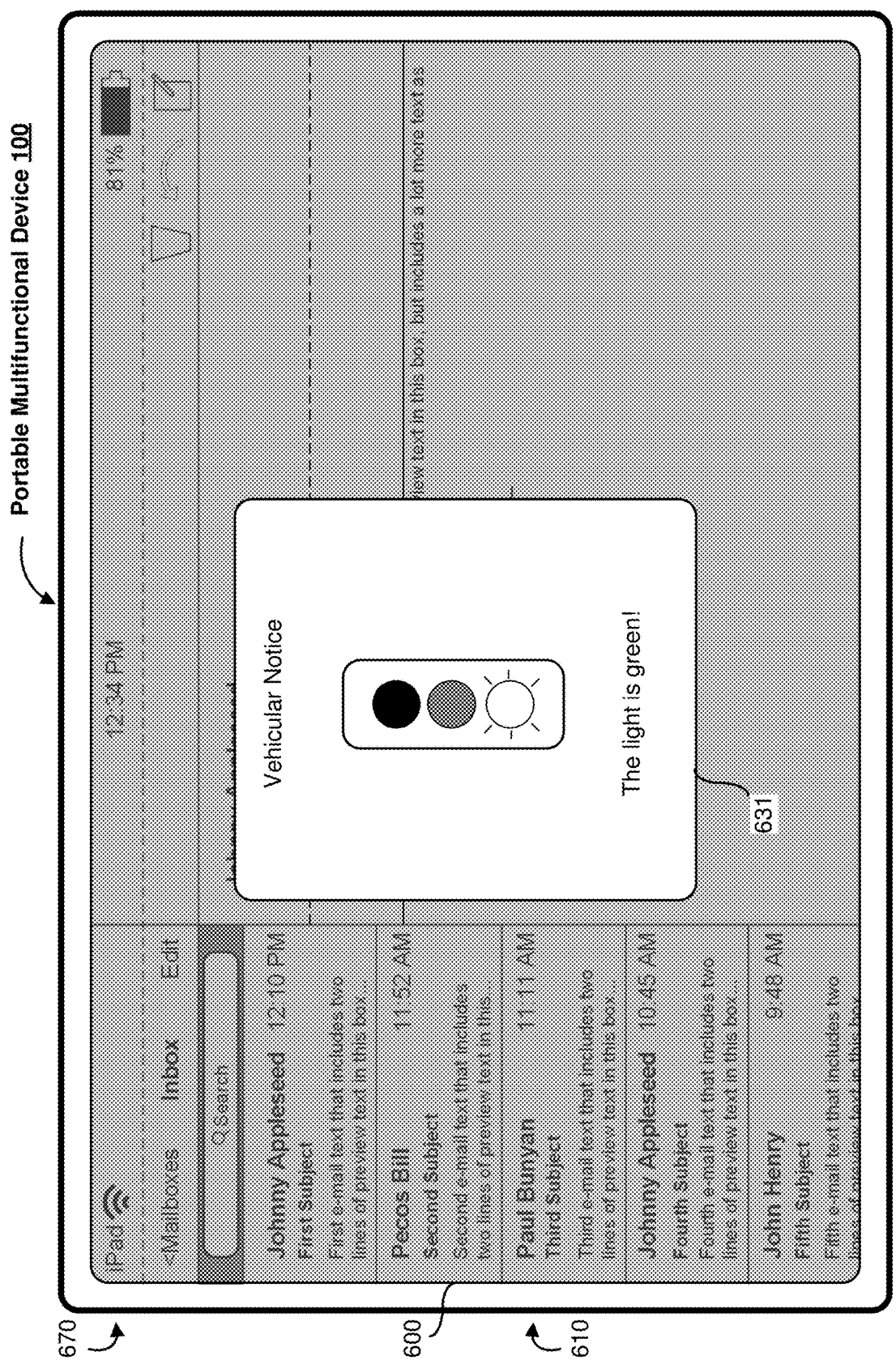

FIG. 6D illustrates the user interface 600 of FIG. 6A in response to receiving an alert indication indicating that a traffic light has changed, in accordance with some embodiments. In various implementations, the vehicle operates under a respective degree of autonomous control that includes automatically stopping at a traffic light in front of the vehicle displaying a stop indicator (e.g., a red light). When the traffic light changes from a stop indicator to a go indicator (e.g., a green light), an alert system integrated into the vehicle sends an alert indication that the driver's attention is needed for operating the vehicle because the traffic light has changed. In response to receiving the alert indication, the user interface 600 includes a traffic-light indication 631 that a traffic light in front of the vehicle has changed from a stop indicator to a go indicator. In various implementations, the traffic-light indication 631 is a pop-up notification or other user interface element that is displayed overlaid on top of the user interface 600 displayed on the display.

In various implementations, the traffic-light indication 631 includes visual content (e.g., text, image, etc.) provided by portable electronic device 100. For example, in various implementations, the traffic light image and the text reading "The light is green!" are stored in memory of the portable electronic device (and are not provided to the device by the alert system).

In various implementations, in addition to displaying the traffic-light indication 631, the portable electronic device 100 provides at least one of an audio feedback cue or haptic feedback cue. For example, in various implementations, the portable electronic device 100 plays an alert sound through a speaker or activates a tactile output generator, vibrating the portable electronic device 100. In various implementations, the audio feedback cue is based on the alert indication such that different alert indications result in different audio feedback cues.

Further, in response to receiving the alert indication, at least a portion of the user interface 600 is disabled. In particular, the device bar 670 and the application region 610 are obscured (e.g., blurred or dimmed). In various implementations, user input received at locations of the application region 610 are ignored by the portable multifunctional device 100 when the portion of the user interface 600 is disabled.

In some embodiments, the user interface 600 ceases to include the traffic-light indication 631 and the portion of the user interface 600 that was disabled is re-enabled in response to receiving a managed indication from the alert system. The alert system can generate the managed indication in response to the condition that required the driver's attention having ended or in response to the alert system having obtained the requested interaction from the driver. Thus, in response to receiving the managed indication, the portable electronic device 100 returns to the state of FIG. 6A.

Figure 6E:
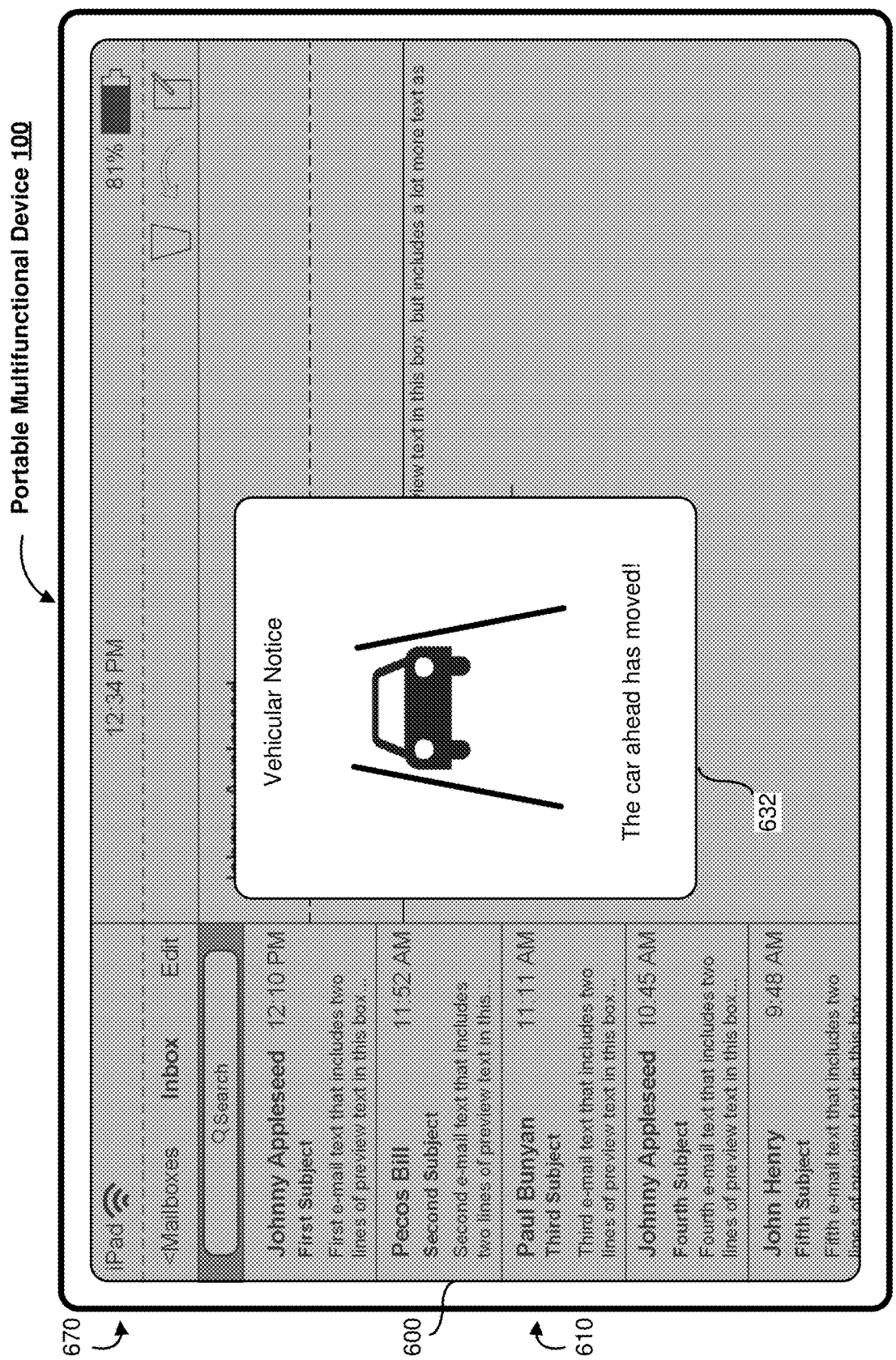

FIG. 6E illustrates the user interface 600 of FIG. 6A in response to receiving an alert indication indicating that movement of another vehicle has changed, in accordance with some embodiments. In various implementations, the vehicle operates under a respective degree of autonomous control that includes automatically stopping behind another vehicle that has stopped or automatically maintaining a distance behind another vehicle in motion. When movement of the other vehicle changes, in some circumstances, an alert system integrated into the vehicle sends an alert indication that the driver's attention is needed for operating the vehicle because the movement of the other vehicle has changed. The alert indication can be generated in response to the other vehicle in front of the vehicle having increased speed, decreased speed, started moving after being stopped, or stopped moving after having been in motion. In response to receiving the alert indication, the user interface 600 includes a vehicle-motion indication 632 that movement of another vehicle in front of the vehicle has changed. In various implementations, the vehicle-motion indication 632 includes information about the change of motion of the vehicle to provide the driver with information that will assist the driver in taking appropriate action. For example, the vehicle-motion indication 632 can indicate that the vehicle has increased speed or has stopped.

Further, in response to receiving the alert indication, at least a portion of the user interface 600 is disabled. In particular, the device bar 670 and the application region 610 are obscured (e.g., blurred or dimmed). In various implementations, user input received at locations of the application region 610 are ignored by the portable multifunctional device 100 when the portion of the user interface 600 is disabled.

Figure 6F:
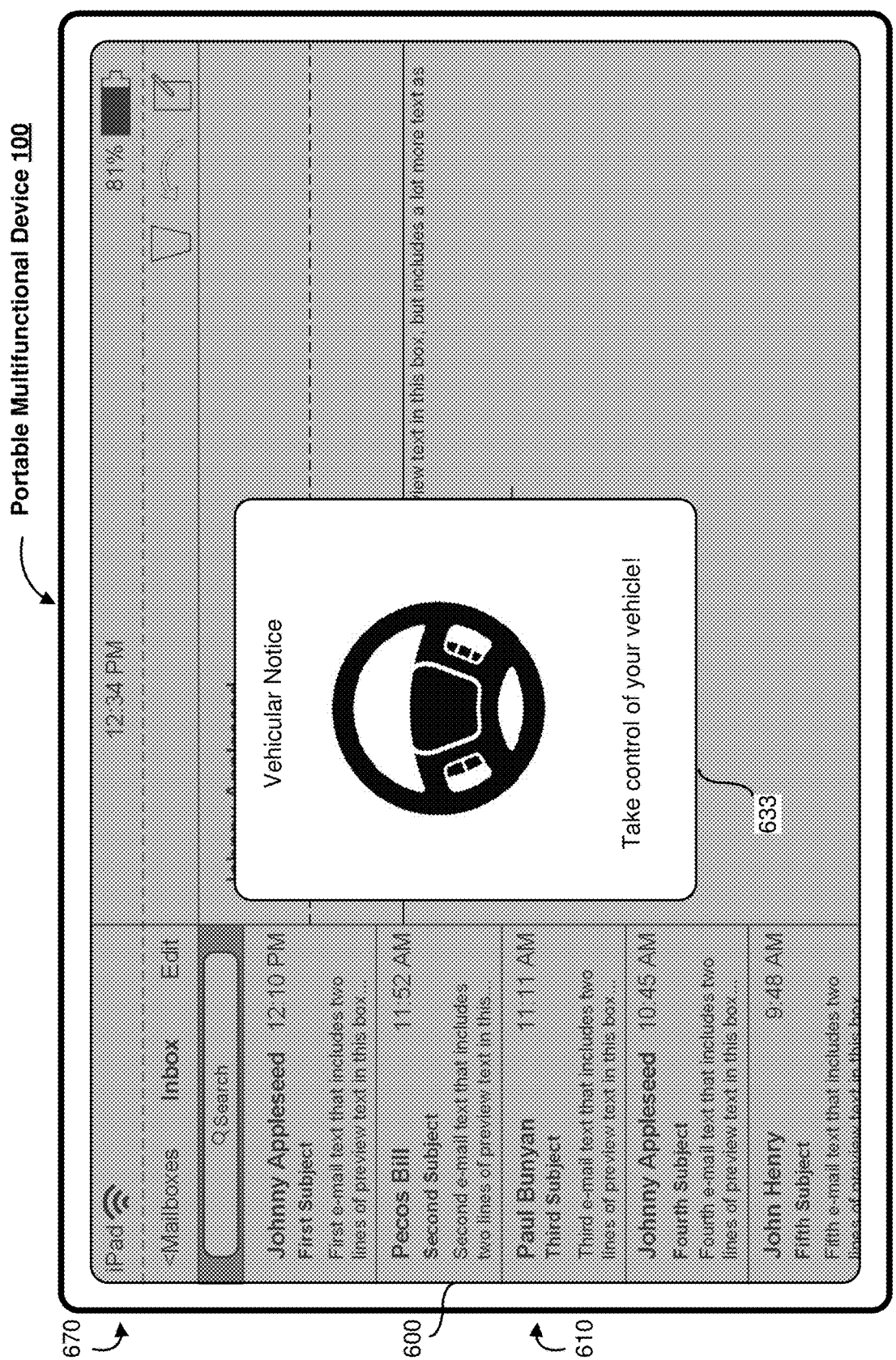

FIG. 6F illustrates the user interface 600 of FIG. 6A in response to receiving an alert indication indicating that the vehicle will decrease the respective degree of autonomous control, in accordance with some embodiments. In response to receiving the alert indication, the user interface 600 includes a take-control indication 633 that the vehicle will decrease the respective degree of autonomous control along with an indication that the driver should resume a greater degree of control of the vehicle.

Further, in response to receiving the alert indication, at least a portion of the user interface 600 is disabled. In particular, the device bar 670 and the application region 610 are obscured (e.g., blurred or dimmed). In various implementations, user input received at locations of the application region 610 are ignored by the portable multifunctional device 100 when the portion of the user interface 600 is disabled.

Figure 6G:
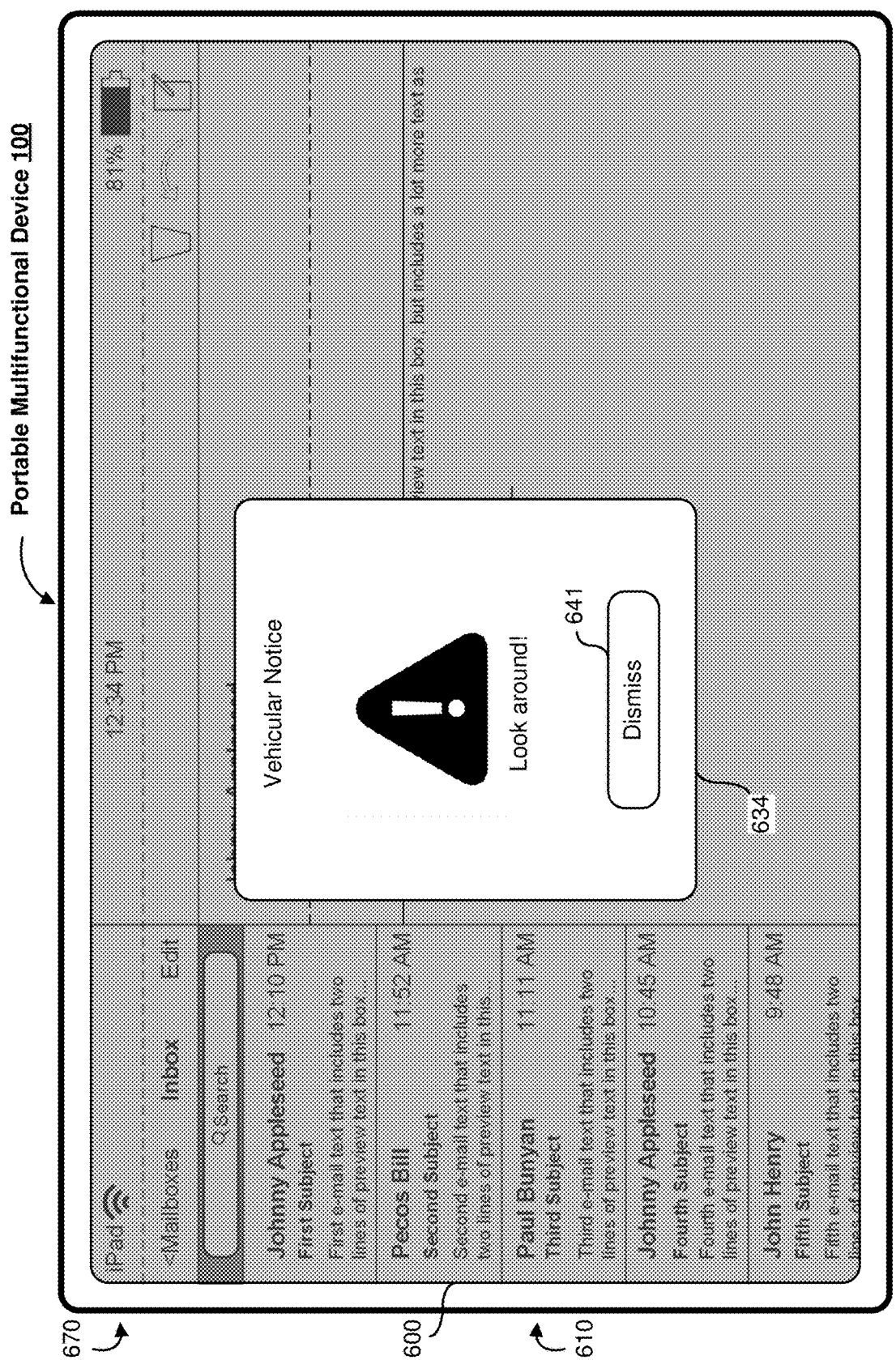

FIG. 6G illustrates the user interface 600 of FIG. 6A in response to receiving an alert indication that that a period of time has passed without driver interaction with the vehicle, in accordance with some embodiments. In various implementations, the vehicle operates under a respective degree of autonomous control that includes long periods without driver interaction. Nevertheless, to improve safety, in some circumstances, the alert system generates an alert indication to have the driver periodically confirms readiness to take control of the vehicle. Further, the driver can confirm that the autonomous control is operating appropriately, such as by navigating to a correct location rather than an incorrect location.

In response to receiving the alert indication, the user interface 600 includes a check indication 634 that a period of time has passed without driver interaction with the vehicle. Further, in response to receiving the alert indication, at least a portion of the user interface 600 is disabled. In particular, the device bar 670 and the application region 610 are obscured (e.g., blurred or dimmed). In various implementations, user input received at locations of the application region 610 are ignored by the portable multifunctional device 100 when the portion of the user interface 600 is disabled.

The check indication 634 includes a dismiss affordance 641. In response to detecting a user input at the location of the dismiss affordance 641, the user interface 600 ceases to include the check indication 634 and the portion of the user interface 600 that was disabled is re-enabled. In some embodiments, the user interface 600 ceases to include the check indication 634 and the portion of the user interface 600 that was disabled is re-enabled in response to receiving a managed indication from the alert system. The alert system can generate the managed indication in response to driver interaction with the vehicle (e.g., placing hands on the steering wheel or touching a touch-sensitive display integrated into the vehicle). Thus, in response to detecting a user input at the location of the dismiss affordance 641 or in response to receiving the managed indication from the alert system, the portable electronic device 100 returns to the state of FIG. 6A.

In various implementations, in response to detecting the user input at the location of the dismiss affordance 641, the portable electronic device 100 transmits a signal to the alert system indicating that the user has dismissed the check indication 634 and, thus, has confirmed readiness to take control of the vehicle.

Figure 6H:
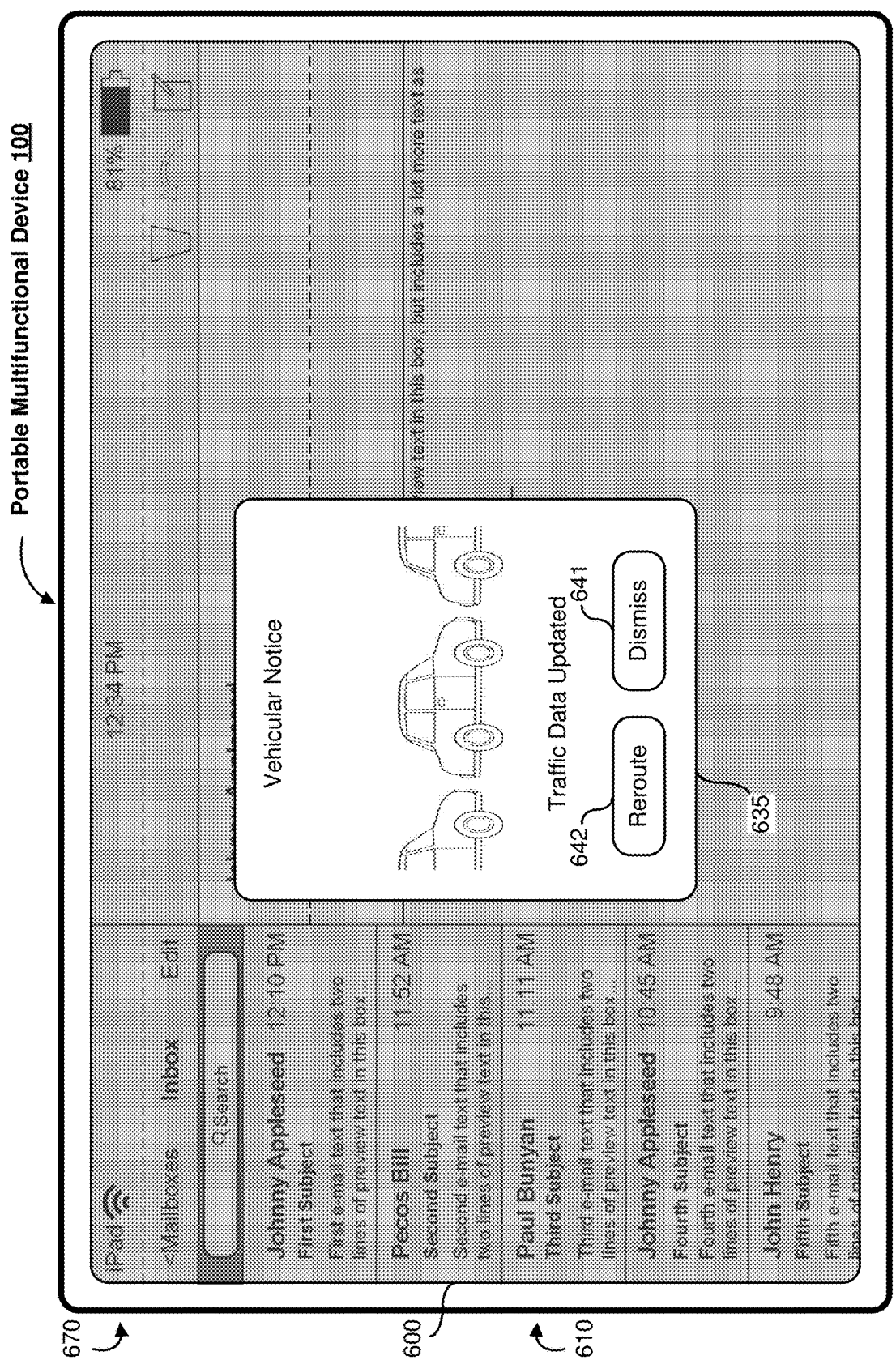

FIG. 6H illustrates the user interface 600 of FIG. 6A in response to receiving an alert indication that traffic data has been updated, in accordance with some embodiments. In response to receiving the alert indication, the user interface 600 includes a traffic-update indication 635 that traffic data has been updated. Further, in response to receiving the alert indication, at least a portion of the user interface 600 is disabled. In particular, the device bar 670 and the application region 610 are obscured (e.g., blurred or dimmed). In various implementations, user input received at locations of the application region 610 are ignored by the portable multifunctional device 100 when the portion of the user interface 600 is disabled.

The traffic-update indication 635 includes a dismiss affordance 641. In response to detecting a user input at the location of the dismiss affordance 641, the user interface 600 ceases to include the traffic-update indication 634 and the portion of the user interface 600 that was disabled is re-enabled.

The traffic-update indication 635 further includes a reroute affordance 642. The reroute affordance 642 provides an option to send a response to the alert system. In response to detecting user input at the location the reroute affordance 642, the portable electronic device 100 transmits a signal to the alert system indicating that the user has selected the option to send a response to the alert system. In response to receiving the signal, in some embodiments, the alert system (or another system integrated into the vehicle) reroutes the vehicle based on the updated traffic data. Thus, instead of operating the vehicle to take a first route to a destination, in response to receiving the signal, the vehicle control system operates the vehicle to take a second route to the destination.

Thus, in various implementations, the portable electronic device 100 receives an alert indication that traffic data has been updated and provides an option to send a response to the alert system to reroute the vehicle based on the updated traffic data. In various implementations, the portable electronic device 100 receives an alert indication that a fuel level of the vehicle is low and provides an option to send a response to the alert system to search for gas stations along the route, or to reroute the vehicle to a gas station. In various implementations, the portable electronic device 100 receives an alert indication that reception of a radio station is poor and provides an option to send a response to the alert system to change radio stations.

Figure 6I:
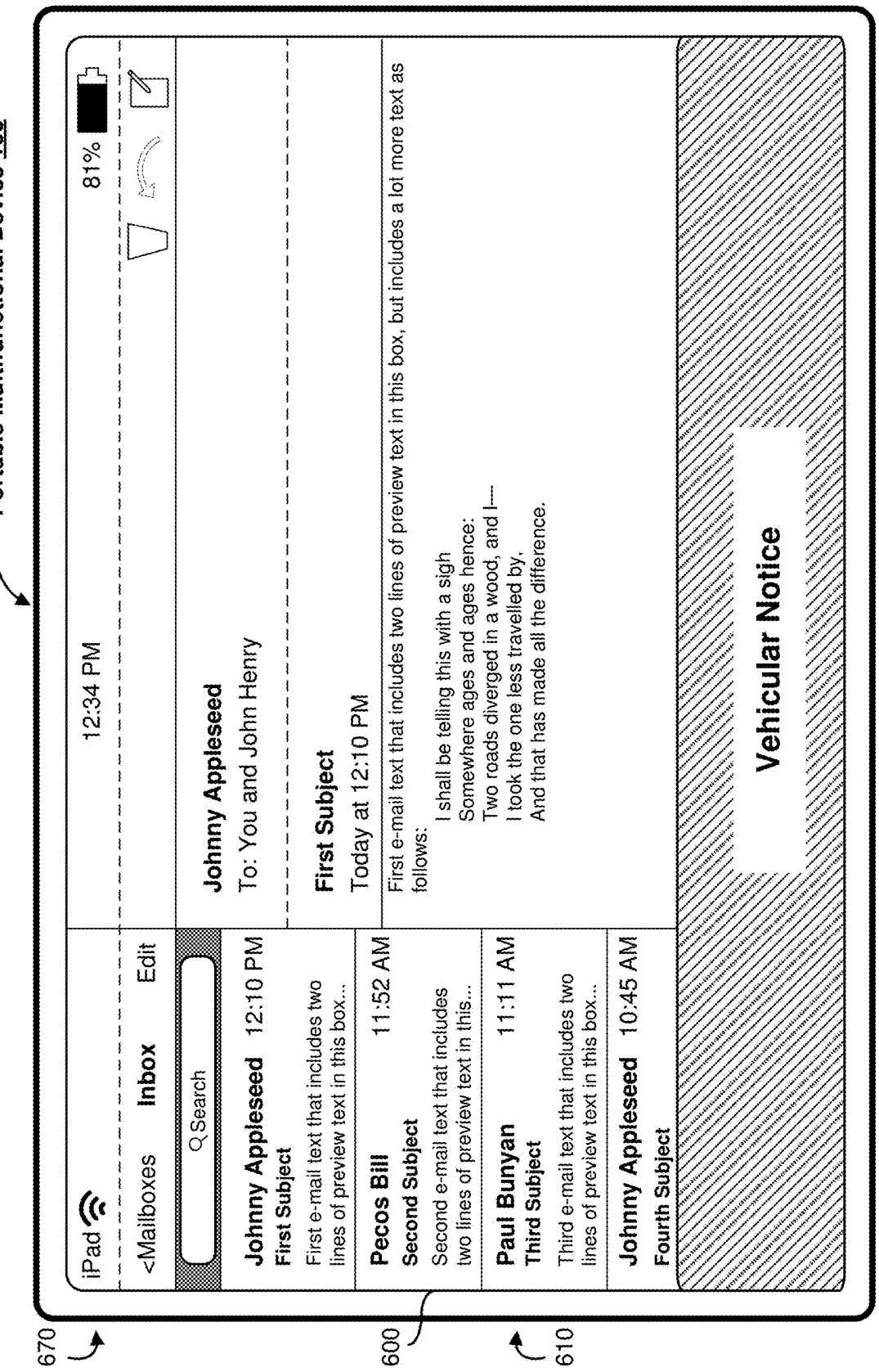
Figure 6J:
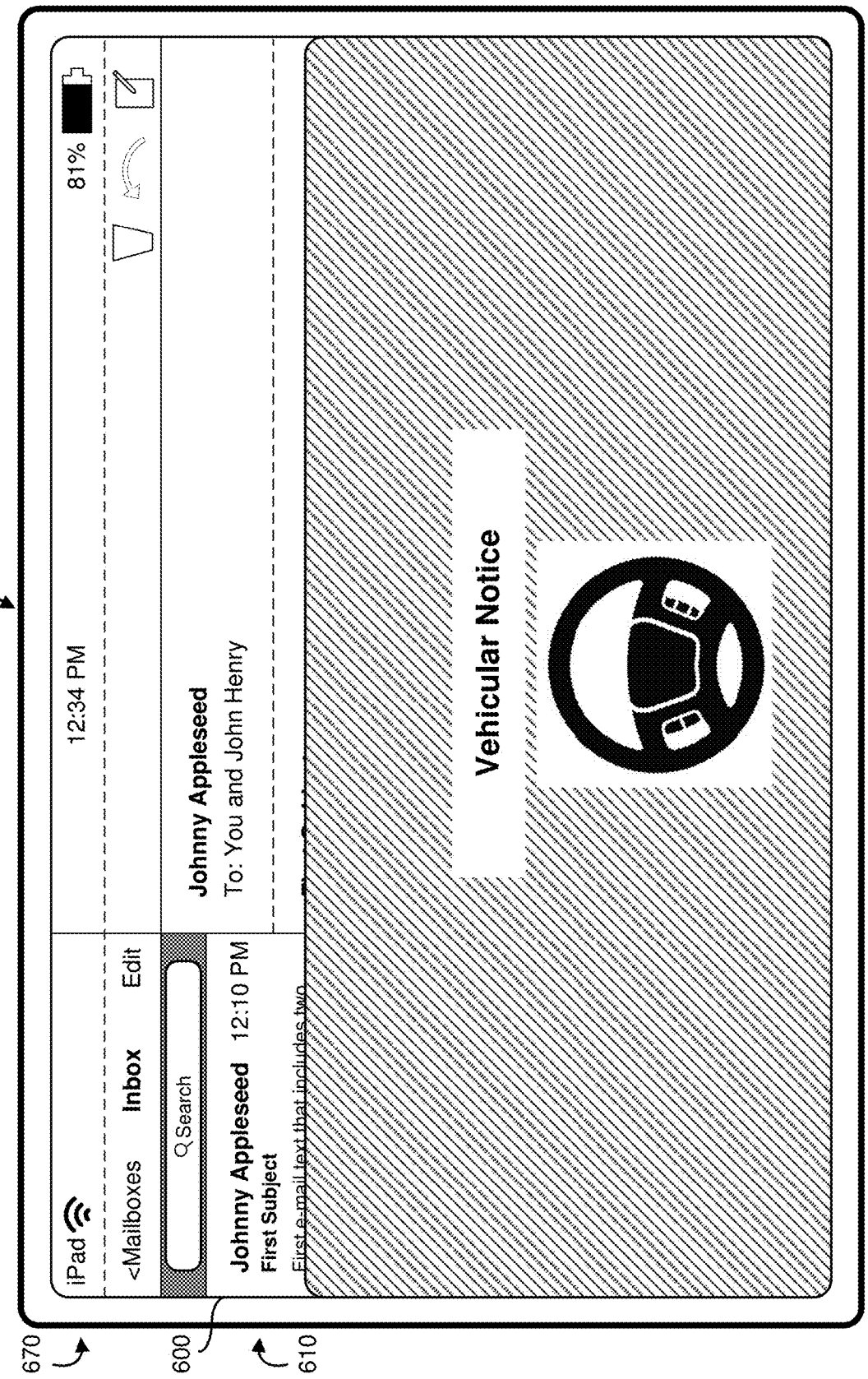
Figure 6K:
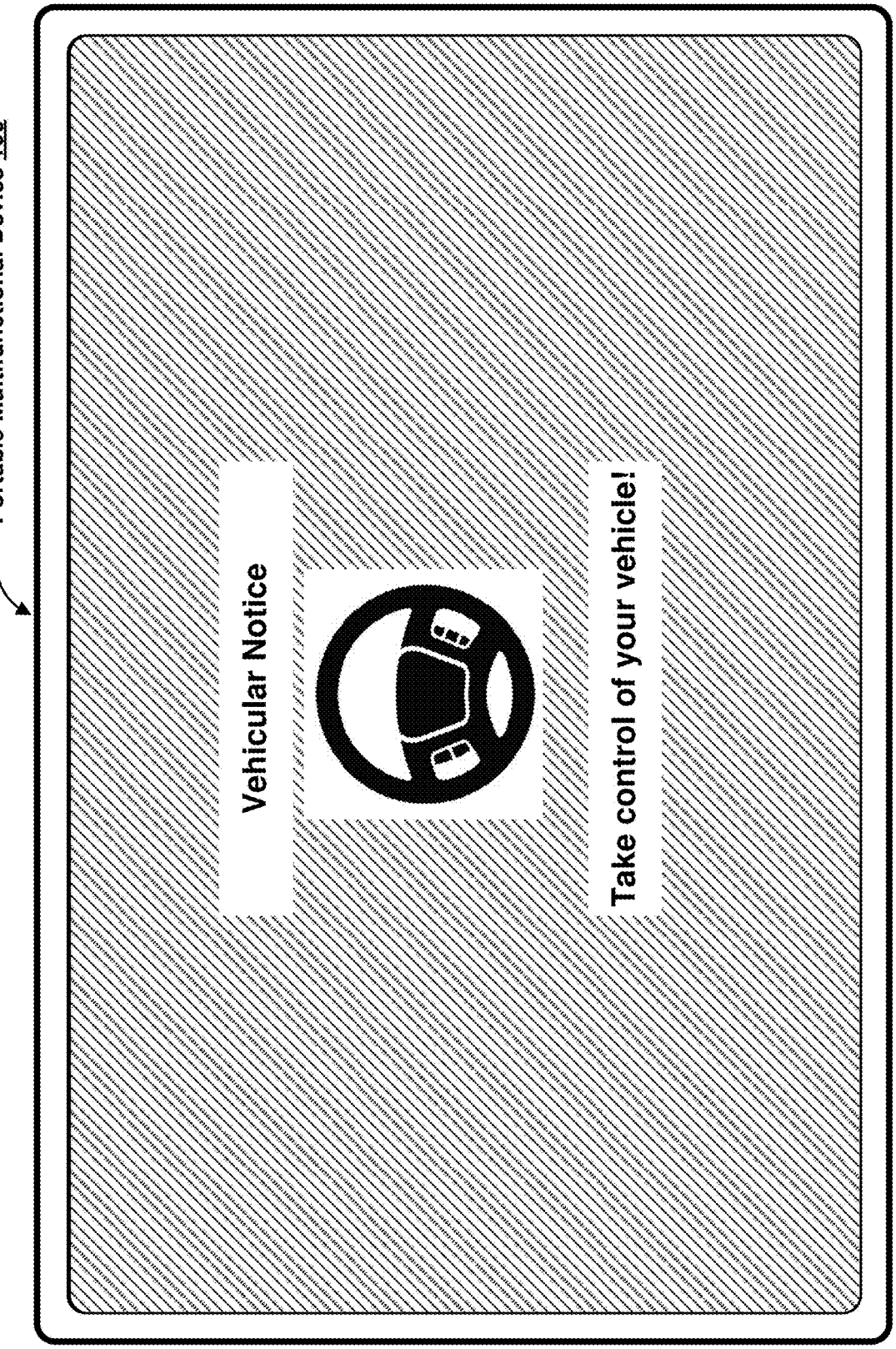

FIGS. 6I-6K illustrate an animation of the user interface 600 of FIG. 6A in response to receiving an alert notification, in accordance with some embodiments. In response to receiving the alert notification, the user interface 600 is replaced with a notification screen 651 indicating the driver's attention is needed for operating the vehicle. In various implementations, replacing the user interface includes displaying an animation in which the notification screen is gradually displayed. For example, in FIGS. 6I-6K, the notification screen appears to slide up from the bottom of the display. In other embodiments, the notification screen fades in or is otherwise gradually displayed. By replacing the user interface 600 in an animation, alarm to the driver is reduced, reducing inadvertent actions that may have a detrimental effect.

Figure 6L:
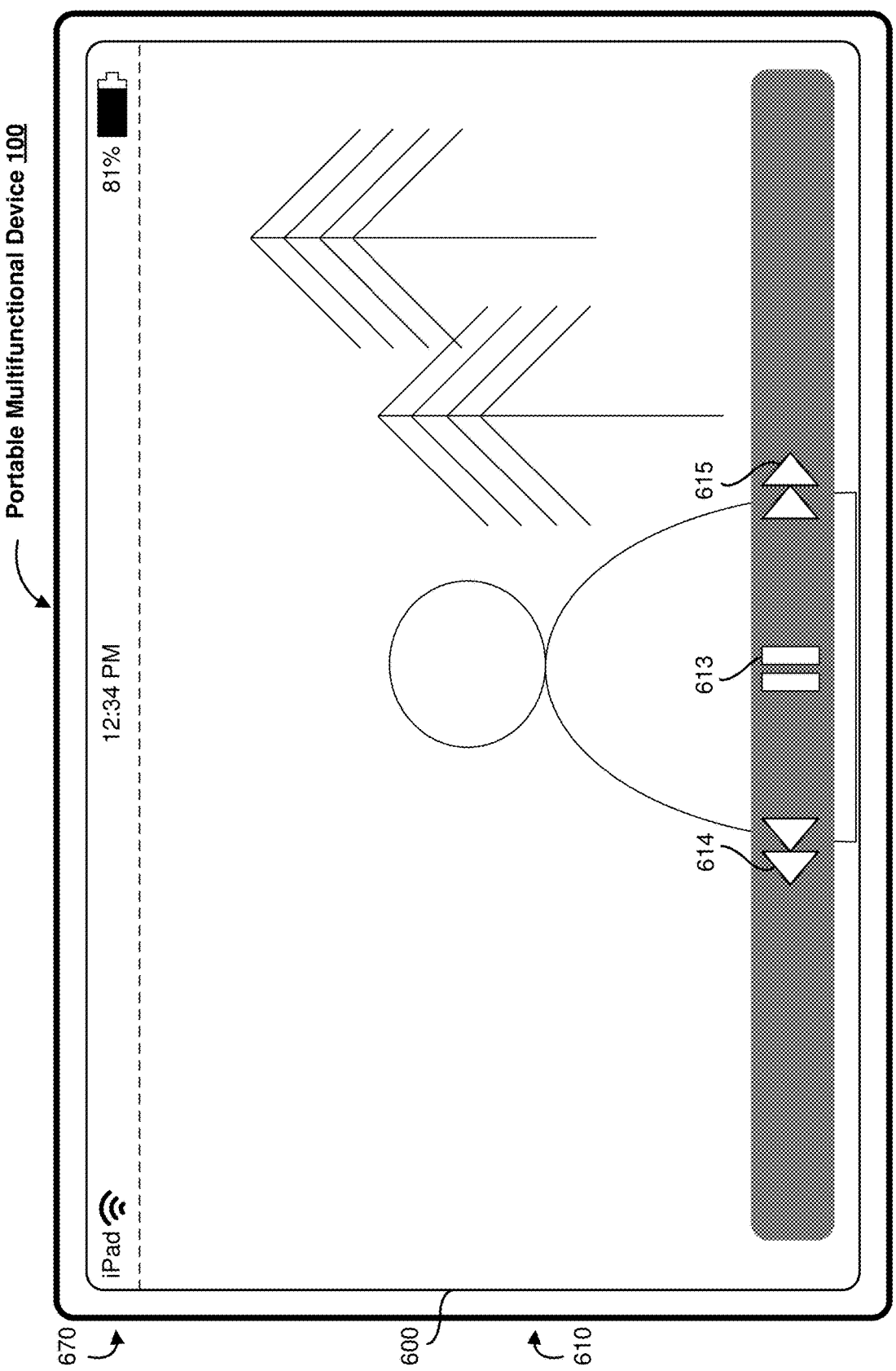

FIG. 6L illustrates a user interface 600 in which the application region 610 displays a video of a video application. The video application includes a pause/play affordance 613 for pausing or resuming playback, a rewind affordance 614 for rewinding the video, and a fast-forward affordance 615 for fast-forwarding the video.

Figure 6M:
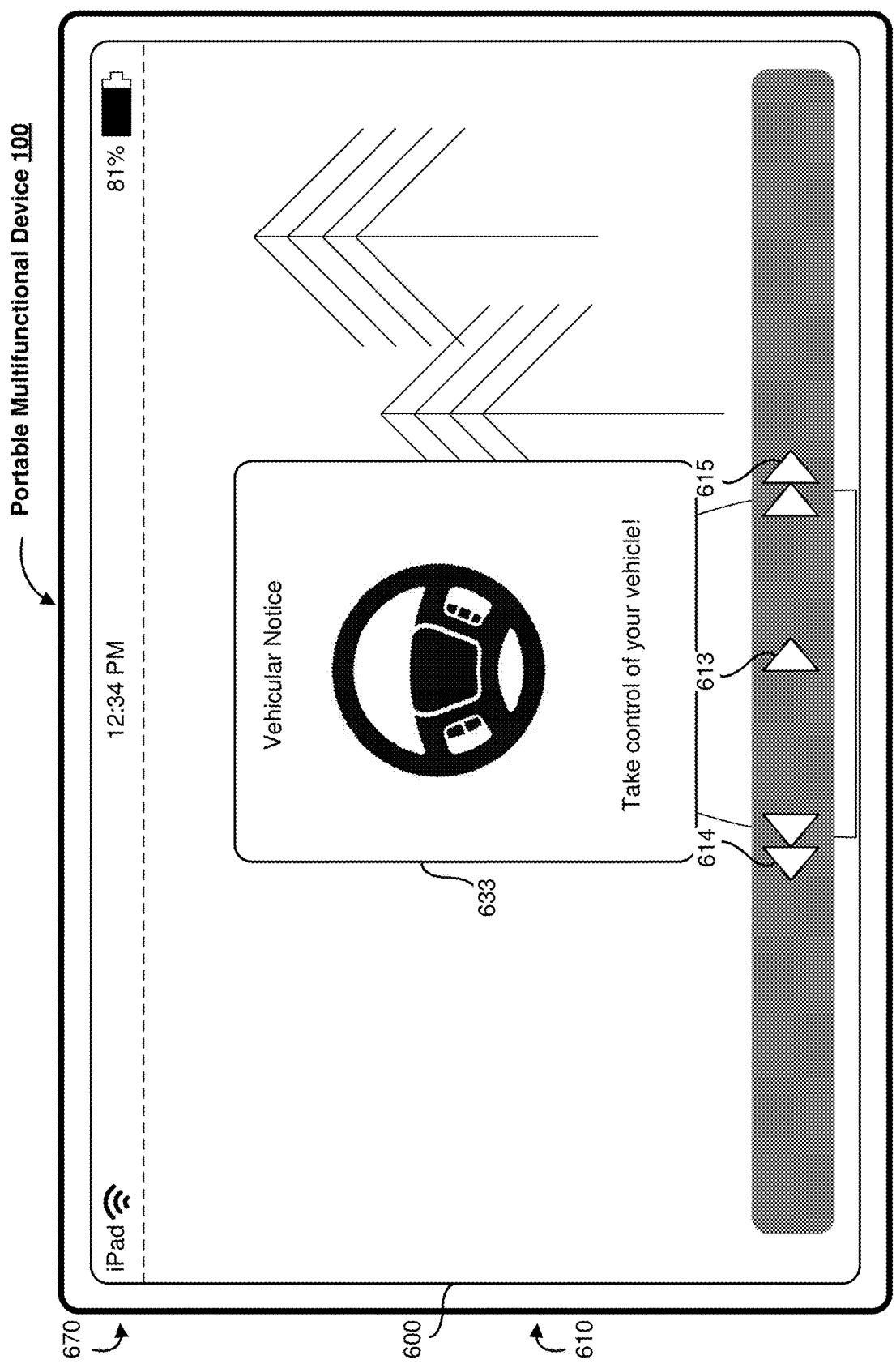

FIG. 6M illustrates the user interface 600 of FIG. 6L in response to receiving an alert indication, in accordance with some embodiments. In response to receiving the alert indication, the user interface 600 includes the take-control indication 633 that the vehicle will decrease the respective degree of autonomous control along with an indication that the driver should resume a greater degree of control of the vehicle. Further, as indicated by the change in the pause/play affordance 613, the portable electronic device 100 has paused playback of the video of the video application. Thus, a portion of the user interface 600 is disabled by pausing content. In various implementations, the content can include audio, video, a game, or other consumable media.

FIG. 6M illustrates that, in response to an alert indication, the portable electronic device 100 disables a portion of the user interface 600 by pausing content. In contrast, FIG. 6D illustrates that, in response to an alert indication, the portable electronic device 100 disables a portion of the user interface 600 by obscuring (e.g., blurring and/or dimming) a portion of the user interface 600 including content within the application region 610. Accordingly, in various implementations, in response to an alert indication, the portable electronic device 100 disables a portion of the user interface 100 based on (e.g., in a manner dependent on) the application displayed in the application region 610. For example, in various implementations, a music application, which is not attention-intensive, is volume-limited. As another example, in various implementations, an email application or an ebook reader application, which is attention-intensive, is blurred. As another example, in various implementations, a gaming application or a video application, which is very attention-intensive, is paused or replaced with a notification screen.

In various implementations, the portable electronic device 100 disables at least a portion of the user interface by preventing one or more application from a pre-defined set from executing. In various implementations, the pre-defined set is inclusive (e.g., "prevent A, B, and C"). In various implementations, the pre-defined set is exclusive (e.g., "prevent all applications except D, E, and F"). For example, in various implementations, the portable electronic device 100 prevents attention-intensive applications from executing, such as a gaming application or a video application. As another example, in various implementations, the portable electronic device 100 only allows non-attention-intensive application to execute, such as a music application or a map application.

Figure 6N:
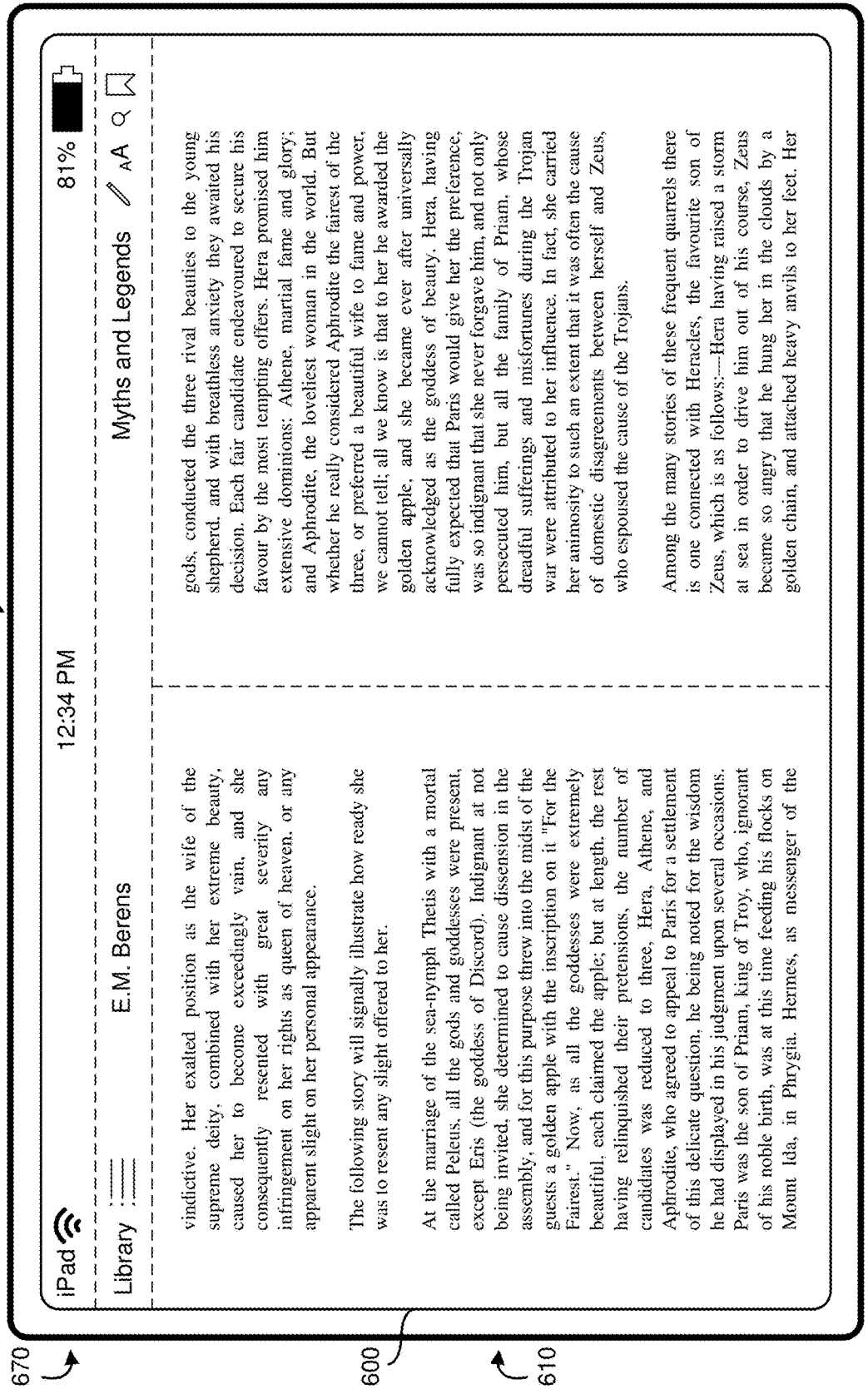

FIG. 6N illustrates a user interface 600 in which the application region 610 displays an electronic book of an ebook reader application.

Figure 6O:
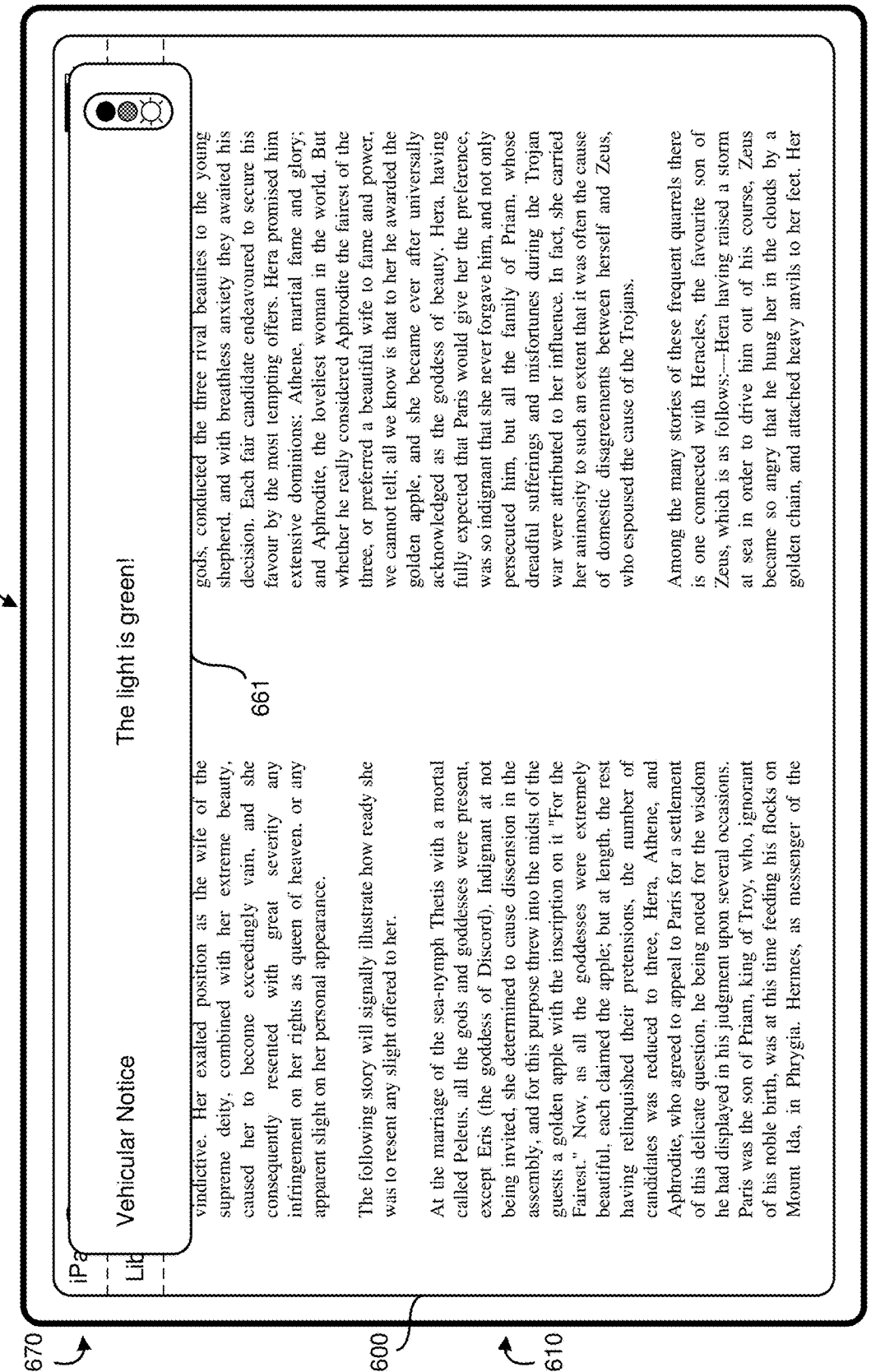

FIG. 6O illustrates the user interface 600 of FIG. 6N in response to receiving a first alert indication that a traffic light has changed, in accordance with some embodiments. In response to receiving the first alert indication, the user interface 600 includes a first visual indication 661 that the traffic light has changed. However, the user interface 600 continues to display the portion of the electronic book.

Figure 6P:
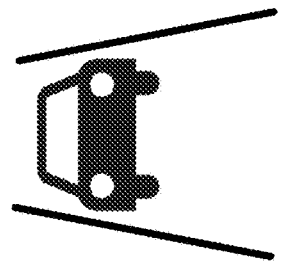

FIG. 6P illustrates the user interface 600 of FIG. 6O in response to receiving a second alert indication that movement of another vehicle has changed, e.g. has moved in response to the changed traffic light, in accordance with some embodiments. In response to receiving the second alert indication, the user interface 600 includes a second visual indication 662 that the other vehicle has moved. Further, in response to receiving the second alert indication, at least a portion of the user interface 600 is disabled. In particular, the device bar 670 and the application region 610 are obscured (e.g., blurred or dimmed). In various implementations, user input received at locations of the application region 610 are ignored by the portable multifunctional device 100 when the portion of the user interface 600 is disabled.

FIG. 6Q illustrates the user interface 600 of FIG. 6P in response to receiving a third alert indication that the driver should resume a greater degree of control of the vehicle, in accordance with some embodiments. In response to receiving the alert notification, the user interface 600 is replaced with a third visual indication 663 that the driver's attention is needed for operating the vehicle in the form of a notification screen.

As shown in FIGS. 6N-6Q, escalating notifications are presented in response to related alert indications. Thus, the alert system can send a second alert indication based on not receiving a response to first alert indication or based on escalating related circumstances that require the driver's attention. Thus, in some circumstances, if the driver responds to the first alert indication and/or the related circumstances do not escalate, a subsequence alert indication is, optionally, not sent to the device.

In some embodiments, the first visual notification is a dismissible notification (e.g., the device will dismiss the notification in response to appropriate user inputs such as a swipe input or selection of a dismiss affordance), while the second notification is not dismissible (e.g., the notification does not include a dismiss affordance and/or is not dismissible with a swipe gesture). In some embodiments, there are three or more levels of escalation to notifications (e.g., a dismissible notification that does not obscure all of the content that was previously being displayed on the device for the least urgent notifications, as shown in FIG. 6O, a non-dismissible notification that does not fully obscure all of the content that was previously being displayed on the device for more urgent notifications, as shown in FIG. 6P, and a non-dismissible notification that obscures all of the content that was previously being displayed on the display for the most urgent notifications, as shown in FIG. 6Q).

Just as the portable electronic device 100, in response to an alert indication, can disable a portion of the user interface 100 based on (e.g., in a manner dependent on) the application displayed in the application region 610, the portable electronic device 100, in response to an alert indication, can disable a portion of the user interface 100 based on (e.g., in a manner dependent on) the alert indication. For example, in various implementations, in response to an alert indication that a radio station reception is poor, the portable electronic device 100 displays a dismissible notification at the top of the screen (e.g., similar to the visual indication 661 of FIG. 6O). As another example, in various implementations, in response to an alert indication that the driver should resume a greater degree of control of the vehicle, the portable electronic device 100 replaces the user interface 600 with a notification screen (e.g., similar to the visual indication 663 of FIG. 6Q).

FIGS. 7A-7C illustrate a flow diagram of a method 700 of presenting vehicular notifications in accordance with some embodiments. The method 700 is performed at an electronic device (e.g., the portable multifunction device 100 in FIG. 1A, or the device 300 in FIG. 3) with a display, a touch-sensitive surface, one or more processors, and non-transitory memory. In some embodiments, the display is a touch-screen display and the touch-sensitive surface is on or integrated with the display. In some embodiments, the display is separate from the touch-sensitive surface. Some operations in method 700 are, optionally, combined and/or the order of some operations is, optionally, changed.

As described below, the method 700 provides an intuitive way to present vehicular notifications. The method reduces the cognitive burden on a user when being presented with vehicular notifications, thereby creating a more efficient human-machine interface. For battery-operated electronic devices, enabling a user to consume vehicular notifications faster and more efficiently conserves power and increases the time between battery charges.

While the device is in communication with an alert system integrated into a vehicle that is operating with at least a respective degree of autonomous control, the device displays (702), on the display, a user interface that is unrelated to operating the vehicle. In some embodiments, the device is a handheld device that is separate from the vehicle. For example, in FIG. 6A, the device displays a user interface 600 including an application region 610 displaying an email user interface of an email application. As another example, in FIG. 6L, the device displays a user interface 600 including an application region 610 displaying a video of a video application. As another example, in FIG. 6N, the device displays a user interface 600 including an application region 610 displaying a portion of an ebook reader application.

Thus, by displaying a user interface that is unrelated to operating the vehicle, a user can operate a handheld device within a vehicle operating with a respective degree of autonomous control, increasing the functionality of the handheld device in contrast to instances in which the handheld device is disabled.

While displaying the user interface on the display, the device receives (704), from the alert system integrated into the vehicle, an alert indication that a driver's attention is needed for operating the vehicle.

In response to receiving the alert indication, the device disables (706) at least a portion of the displayed user interface. For example, in FIG. 6D, the device dims the application region 610 including content. Disabling at least a portion of the displayed user interface increases the efficacy of transferring the driver's attention from the handheld electronic device to the vehicle, thereby increasing the safety of operating the handheld device while the vehicle operating with a respective degree of autonomous control. Further, disabling at least a portion of the user interface while the driver's attention is to be with the vehicle rather than the handheld device conserves power, not only because it reduces interaction with the device. Reducing interaction with the device conserves power and increases the time between battery charges and reduces wear-and-tear of the device.

In some embodiments, disabling at least a portion of the displayed user interface includes ignoring (708) at least one user input received via one or more input devices of the device. For example, in FIG. 6D, the device ignores user interaction with the dimmed application region 610. Ignoring user interactions with the device increases the efficacy of transferring the driver's attention from the handheld electronic device to the vehicle, as the driver cannot interact with the handheld electronic device to consume additional content.

In some embodiments, disabling at least a portion of the displayed user interface includes obscuring (710) at least a portion of the display. For example, in FIG. 6D the device obscures the application region 610 by dimming it. Obscuring at least a portion of the display increases the efficacy of transferring the driver's attention from the handheld electronic device to the vehicle, as the driver cannot easily consume content that is obscured.

In some embodiments, disabling at least a portion of the displayed user interface includes pausing (712) content. For example, in FIG. 6M, the device pauses a video being played by the video application. Pausing content increases the efficacy of transferring the driver's attention from the handheld electronic device to the vehicle, as the driver cannot easily consume content that is paused.

In some embodiments, disabling at least a portion of the displayed user interface includes preventing (714) one or more applications from a pre-defined set from executing. For example, in various implementations, the device prevents attention-intensive applications from executing, such as a gaming application or a video application. As another example, in various implementations, the device only allows non-attention-intensive application to execute, such as a music application or a map application.

In some embodiments, disabling at least a portion of the displayed user interface is based on the alert indication (716). For example, in various implementations, in response to an alert indication that a radio station reception is poor, the device displays a dismissible notification at the top of the screen (e.g., similar to the visual indication 661 of FIG. 6O). As another example, in various implementations, in response to an alert indication that the driver should resume a greater degree of control of the vehicle, the device replaces the user interface with a notification screen (e.g., similar to the visual indication 663 of FIG. 6Q). Accordingly, the degree to which the displayed user interface is disabled is based on the desirably of driver interaction with the vehicle, balancing the goals of safety and usability of the handheld electronic device.

In some embodiments, disabling at least a portion of the displayed user interface is based on an application (718) displayed in the user interface. For example, in FIG. 6M, in response to an alert indication, the device disables a portion of the user interface 600 by pausing content. In contrast, in FIG. 6D, in response to an alert indication, the device disables a portion of the user interface 600 by obscuring (e.g., blurring and/or dimming) a portion of the user interface 600 including content within the application region 610.

Also in response to receiving the alert indication, the device displays (720), on the display, a visual indication that the driver's attention is needed for operating the vehicle. For example, in FIG. 6C, the device displays a status indicator 621 that indicates that the driver's attention is needed for operating the vehicle. As another example, in FIG. 6F, the device displays a take-control indication 633 that indicates that the driver's attention is needed for operating the vehicle. As another example, in FIG. 6K, the device displays a notification screen 651 that indicates that the driver's attention is needed for operating the vehicle.

Displaying a visual indicator prompts the transfer of the driver's attention from the handheld electronic device to the vehicle, thereby increasing the safety of operating the handheld device while the vehicle operating with a respective degree of autonomous control.

In some embodiments, displaying the visual indication includes changing (722) display of a status indicator. For example, from FIG. 6B to FIG. 6C, the device changes the status indicator 621 to indicate that the driver's attention is needed for operating the vehicle. Displaying a status indicator provides a driver with continuous information regarding the status of the vehicle while operating the handheld device, reducing the transfer of the driver's attention from the handheld device to the vehicle when it is not needed or requested. Accordingly, the driver can more efficiently use the handheld device, reducing power consumption.

In some embodiments, displaying the visual indication includes displaying a notification in a respective portion of the display. For example, in FIG. 6E, the device displays a vehicle-motion indication 632 that motion of another vehicle in front of the vehicle has changed. As another example, in FIG. 6O, the device displays a traffic-light indication 661 that a traffic light in front of the vehicle has changed. By displaying a notification in a respective portion of the display, the user interface need not display a persistent status indicator on the display. By using less space on the screen, a smaller (and less expensive) screen can provide the same usability.

In some embodiments, displaying the visual indication includes replacing (726) at least a portion of the displayed user interface with a notification screen. For example, in FIG. 6Q, the device replaces the displayed user interface with a notification screen 663. Replacing the displayed user interface with a notification screen increases the efficacy of transferring the driver's attention from the handheld electronic device to the vehicle, thereby increasing the safety of operating the handheld device while the vehicle operating with a respective degree of autonomous control.

In some embodiments, the device displays (728), on the display, an animation in which the visual indication that the driver's attention is needed for operating the vehicle is gradually displayed. For example, in FIGS. 6I-6K, the notification screen 651 is gradually displayed by sliding up from the bottom of the display. By replacing the displayed user interface using an animation, alarm to the driver, which may result in inadvertent actions with detrimental effect, is reduced.

In some embodiments, displaying the visual indication includes displaying (730) a traffic-light indication that a traffic light in front of the vehicle has changed. For example, in FIG. 6D, the device displays a traffic-light indication 631 that a traffic light in front of the vehicle has changed.

In some embodiments, displaying the visual indication includes displaying (732) a vehicle-motion indication that movement of another vehicle in front of the vehicle has changed. For example, in FIG. 6E, the device displays a vehicle-motion indication 632 that movement of another vehicle in front of the vehicle has changed.

In some embodiments, displaying the visual indication includes displaying (734) a take-control indication that the vehicle will decrease the respective degree of autonomous control. For example, in FIG. 6F, the device displays a take-control indication 633 that the vehicle will decrease the respective degree of autonomous control along with an indication that the driver should resume a greater degree of control of the vehicle.

In some embodiments, displaying the visual indication includes displaying (736) a check indication that a period of time has passed without driver interaction with the vehicle. For example, in FIG. 6G, the device displays a check indication 634 that a period of time has passed without driver interaction with the vehicle. In some embodiments, in response to driver interaction with at least one of the check indication of the vehicle, the device ceases (738) display of the check indication and re-enables the portion of the displayed user interface. For example, in FIG. 6G, in response to detecting a user input at the location of the dismiss affordance 641, the device returns to the state of FIG. 6A.

In some embodiments, displaying the visual indication includes displaying (740) an option to send a response to the alert system. For example, in FIG. 6H, the device displays a traffic-update indication 635 including a reroute affordance 642 that sends a response to the alert system. Providing an option to send a response to the alert system via the handheld device reduces the transfer of the driver's attention from the handheld device to the vehicle when it is not needed or requested. Accordingly, the driver can more efficiently use the handheld device, reducing power consumption.

In some embodiments, displaying the visual indication includes displaying (742) visual content stored in the non-transitory memory. For example, in FIG. 6E, the device displays a traffic-light indication 631 including the traffic light image and the text reading "The light is green!" that are stored in non-transitory memory of the device (and are not provided to the device by the alert system).

In some embodiments, displaying the visual indication includes providing (744) at least one of an audio feedback cure or a haptic feedback cue. For example, in various implementations, the device plays an alert sound through a speaker or activates a tactile output generator, vibrating the device. Additional feedback cues increases the efficacy of transferring the driver's attention from the handheld electronic device to the vehicle, thereby increasing the safety of operating the handheld device while the vehicle operating with a respective degree of autonomous control.

In some embodiments, the device receives (746), from the alert system integrated into the vehicle, a second alert indication related to the alert indication. In response to receiving the second alert indication, the device disables (748) at least an additional portion of the displayed user interface. In some embodiments, the device replaces (750) the displayed user interface with a notification screen. Also in response to receiving the second alert indication, the device displays (752), on the display, a second visual indication based on the second alert indication. For example, in FIG. 6P, the device displays a first visual indication, the vehicle-motion indication 662 and, in FIG. 6Q, the device displays a second visual indication, the notification screen 663. Accordingly, the degree to which the displayed user interface is disabled is based on the desirably of driver interaction with the vehicle, balancing the goals of safety and usability of the handheld electronic device.

In some embodiments, the device receives (754), via one or more input devices of the device, a user input dismissing the visual indication and, in response, ceases (756) display of the visual indication and re-enables the portion of the displayed user interface. For example, in FIG. 6G, in response to detecting a user input at the location of the dismiss affordance 641, the device returns to the state of FIG. 6A.

In some embodiments, the device receives (758), from the alert system integrated into the vehicle, a managed indication that the driver's attention is no longer needed for operating the vehicle and, in response, ceases (760) display of the visual indication and re-enables the portion of the displayed user interface. For example, in various implementations, the alert system generates the managed indication in response to the condition that required the driver's attention having ended or in response to the alert system having obtained the requested interaction from the driver.

It should be understood that the particular order in which the operations in FIGS. 7A-7C have been described is merely example and is not intended to indicate that the described order is the only order in which the operations could be performed. One of ordinary skill in the art would recognize various ways to reorder the operations described herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A method comprising:
   at a device with one or more processors, non-transitory memory, and a display:
   while the device is in communication with an alert system integrated into a vehicle that is operating under semi-autonomous control or full autonomous control, displaying, on the display, a user interface that is unrelated to operating the vehicle, wherein the device is a handheld device that is separate from the vehicle;
   while displaying the user interface on the display, receiving, from the alert system integrated into the vehicle, an alert indication that a driver's attention is needed for operating the vehicle; and
   in response to receiving the alert indication:
   disabling at least a portion of the displayed user interface; and
   displaying, on the display, a visual indication that the driver's attention is needed for operating the vehicle.

2. The method of claim 1, wherein displaying the visual indication includes changing display of a status indicator.

3. The method of claim 1, wherein displaying the visual indication includes displaying a notification in a respective portion of the display.

4. The method of claim 1, wherein displaying the visual indication includes replacing at least a portion of the displayed user interface with a notification screen.

5. The method of claim 4, wherein replacing the displayed user interface includes displaying an animation in which the visual indication that the driver's attention is needed for operating the vehicle is gradually displayed.

6. The method of claim 1, wherein displaying the visual indication includes displaying a traffic-light indication that a traffic light in front of the vehicle has changed.

7. The method of claim 1, wherein displaying the visual indication includes displaying a vehicle-motion indication that movement of another vehicle in front of the vehicle has changed.

8. The method of claim 1, wherein displaying the visual indication includes displaying a take-control indication that the vehicle will decrease a degree-of autonomous control, wherein the decrease of the degree of the autonomous control includes performing an operation selected from the set consisting of:
   decreasing from full autonomous control to semi-autonomous control;
   decreasing from full autonomous control to no autonomous control;
   decreasing from a first degree of semi-autonomous control to a a second degree of semi-autonomous control; and decreasing from semi-autonomous control to no autonomous control.

9. The method of claim 1, wherein displaying the visual indication includes displaying a check indication that a period of time has passed without driver interaction with the vehicle, further comprising, in response to driver interaction with at least one of the check indication or the vehicle, ceasing display of the check indication and re-enabling the portion of the displayed user interface.

10. The method of claim 1, wherein displaying the visual indication includes displaying an option to send a response to the alert system.

11. The method of claim 1, wherein displaying the visual indication further comprises providing at least one of an audio feedback cue or haptic feedback cue.

12. The method of claim 1, wherein disabling at least a portion of the displayed user interface includes obscuring at least a portion of the display.

13. The method of claim 1, wherein disabling at least of portion of the displayed user interface includes pausing content.

14. The method of claim 1, wherein disabling at least of portion of the displayed user interface includes preventing one or more applications from a pre-defined set from executing.

15. The method of claim 1, further comprising:
receiving, from the alert system integrated into the vehicle, a second alert indication related to the alert indication; and
in response to detecting the second alert indication:
disabling at least an additional portion of the displayed user interface; and
displaying, on the display, a second visual indication based on the second alert indication.

16. The method of claim 1, further comprising:
receiving, via one or more input devices of the device, a user input dismissing the visual indication; and
in response to receiving the user input:
ceasing display of the visual indication; and
re-enabling the portion of the displayed user interface.

17. The method of claim 1, further comprising:
receiving, from the alert system integrated into the vehicle, a managed indication that the driver's attention is no longer needed for operating the vehicle; and
in response to detecting the managed indication:
ceasing display of the visual indication; and
re-enabling the portion of the displayed user interface.

18. An electronic device, comprising:
a display;
one or more processors;
non-transitory memory; and
one or more programs, wherein the one or more programs are stored in the memory and configured to be executed by the one or more processors, the one or more programs including instructions for:
while the device is in communication with an alert system integrated into a vehicle that is operating under semi-autonomous control or full autonomous control, displaying, on the display, a user interface that is unrelated to operating the vehicle, wherein the device is a handheld device that is separate from the vehicle;
while displaying the user interface on the display, receiving, from the alert system integrated into the vehicle, an alert indication that a driver's attention is needed for operating the vehicle; and
in response to receiving the alert indication:
disabling at least a portion of the displayed user interface; and
displaying, on the display, a visual indication that the driver's attention is needed for operating the vehicle.

19. A non-transitory computer readable storage medium storing one or more programs, the one or more programs comprising instructions, which, when executed by an electronic device with a display cause the electronic device to:
while the device is in communication with an alert system integrated into a vehicle that is operating under at least partial autonomous control semi-autonomous control or full autonomous control, display on the display, a user interface that is unrelated to operating the vehicle, wherein the device is a handheld device that is separate from the vehicle;
while displaying the user interface on the display, receive, from the alert system integrated into the vehicle, an alert indication that a driver's attention is needed for operating the vehicle; and
in response to receiving the alert indication:
disable at least a portion of the displayed user interface; and
display, on the display, a visual indication that the driver's attention is needed for operating the vehicle.

20. The device of claim 18, wherein displaying the visual indication includes changing display of a status indicator.

21. The device of claim 18, wherein displaying the visual indication includes displaying a notification in a respective portion of the display.

22. The device of claim 18, wherein displaying the visual indication includes replacing at least a portion of the displayed user interface with a notification screen.

23. The device of claim 22, wherein replacing the displayed user interface includes displaying an animation in which the visual indication that the driver's attention is needed for operating the vehicle is gradually displayed.

24. The device of claim 18, wherein displaying the visual indication includes displaying a traffic-light indication that a traffic light in front of the vehicle has changed.

25. The device of claim 18, wherein displaying the visual indication includes displaying a vehicle-motion indication that movement of another vehicle in front of the vehicle has changed.

26. The device of claim 18, wherein displaying the visual indication includes displaying a take-control indication that the vehicle will decrease a degree of autonomous control, wherein the decrease of the degree of the autonomous control includes performing an operation selected from the set consisting of:
decreasing from full autonomous control to semi-autonomous control;
decreasing from full autonomous control to no autonomous control;
decreasing from a first degree of semi-autonomous control to a a second degree of semi-autonomous control; and
decreasing from semi-autonomous control to no autonomous control.

27. The device of claim 18, wherein displaying the visual indication includes displaying a check indication that a period of time has passed without driver interaction with the vehicle, further comprising, in response to driver interaction with at least one of the check indication or the vehicle, ceasing display of the check indication and re-enabling the portion of the displayed user interface.

28. The device of claim 18, wherein displaying the visual indication includes displaying an option to send a response to the alert system.

29. The device of claim 18, wherein displaying the visual indication further comprises providing at least one of an audio feedback cue or haptic feedback cue.

30. The device of claim 18, wherein disabling at least a portion of the displayed user interface includes obscuring at least a portion of the display.

31. The device of claim 18, wherein disabling at least of portion of the displayed user interface includes pausing content.

32. The device of claim 18, wherein disabling at least of portion of the displayed user interface includes preventing one or more applications from a pre-defined set from executing.

33. The device of claim 18, further comprising:
receiving, from the alert system integrated into the vehicle, a second alert indication related to the alert indication; and
in response to detecting the second alert indication:
disabling at least an additional portion of the displayed user interface; and
displaying, on the display, a second visual indication based on the second alert indication.

34. The device of claim 18, further comprising:
receiving, via one or more input devices of the device, a user input dismissing the visual indication; and
in response to receiving the user input:
ceasing display of the visual indication; and
re-enabling the portion of the displayed user interface.

35. The device of claim 18, further comprising:
receiving, from the alert system integrated into the vehicle, a managed indication that the driver's attention is no longer needed for operating the vehicle; and
in response to detecting the managed indication:
ceasing display of the visual indication; and
re-enabling the portion of the displayed user interface.

36. The non-transitory computer readable storage medium of claim 19, wherein displaying the visual indication includes changing display of a status indicator.

37. The non-transitory computer readable storage medium of claim 19, wherein displaying the visual indication includes displaying a notification in a respective portion of the display.

38. The non-transitory computer readable storage medium of claim 19, wherein displaying the visual indication includes replacing at least a portion of the displayed user interface with a notification screen.

39. The non-transitory computer readable storage medium of claim 38, wherein replacing the displayed user interface includes displaying an animation in which the visual indication that the driver's attention is needed for operating the vehicle is gradually displayed.

40. The non-transitory computer readable storage medium of claim 19, wherein displaying the visual indication includes displaying a traffic-light indication that a traffic light in front of the vehicle has changed.

41. The non-transitory computer readable storage medium of claim 19, wherein displaying the visual indication includes displaying a vehicle-motion indication that movement of another vehicle in front of the vehicle has changed.

42. The non-transitory computer readable storage medium of claim 19, wherein displaying the visual indication includes displaying a take-control indication that the vehicle will decrease a degree of autonomous control, wherein the decrease of the degree of the autonomous control includes performing an operation selected from the set consisting of:
decreasing from full autonomous control to semi-autonomous control;
decreasing from full autonomous control to no autonomous control;
decreasing from a first degree of semi-autonomous control to a a second degree of semi-autonomous control; and
decreasing from semi-autonomous control to no autonomous control.

43. The non-transitory computer readable storage medium of claim 19, wherein displaying the visual indication includes displaying a check indication that a period of time has passed without driver interaction with the vehicle, further comprising, in response to driver interaction with at least one of the check indication or the vehicle, ceasing display of the check indication and re-enabling the portion of the displayed user interface.

44. The non-transitory computer readable storage medium of claim 19, wherein displaying the visual indication includes displaying an option to send a response to the alert system.

45. The non-transitory computer readable storage medium of claim 19, wherein displaying the visual indication further comprises providing at least one of an audio feedback cue or haptic feedback cue.

46. The non-transitory computer readable storage medium of claim 19, wherein disabling at least a portion of the displayed user interface includes obscuring at least a portion of the display.

47. The non-transitory computer readable storage medium of claim 19, wherein disabling at least of portion of the displayed user interface includes pausing content.

48. The non-transitory computer readable storage medium of claim 19, wherein disabling at least of portion of the displayed user interface includes preventing one or more applications from a pre-defined set from executing.

49. The non-transitory computer readable storage medium of claim 19, further comprising:
receiving, from the alert system integrated into the vehicle, a second alert indication related to the alert indication; and
in response to detecting the second alert indication:
disabling at least an additional portion of the displayed user interface; and
displaying, on the display, a second visual indication based on the second alert indication.

50. The non-transitory computer readable storage medium of claim 19, further comprising:
receiving, via one or more input devices of the device, a user input dismissing the visual indication; and
in response to receiving the user input:
ceasing display of the visual indication; and
re-enabling the portion of the displayed user interface.

51. The non-transitory computer readable storage medium of claim 19, further comprising:
receiving, from the alert system integrated into the vehicle, a managed indication that the driver's attention is no longer needed for operating the vehicle; and
in response to detecting the managed indication:
ceasing display of the visual indication; and
re-enabling the portion of the displayed user interface.

52. The method of claim 1, wherein semi-autonomous control corresponds to one of Society of Automotive Engineers (SAE) autonomous control levels 1-4, and wherein full autonomous control corresponds to SAE autonomous control level 5.

53. The device of claim 18, wherein semi-autonomous control corresponds to one of Society of Automotive Engineers (SAE) autonomous control levels 1-4, and wherein full autonomous control corresponds to SAE autonomous control level 5.

54. The non-transitory computer readable storage medium of claim 19, wherein semi-autonomous control corresponds to one of Society of Automotive Engineers (SAE) autonomous control levels 1-4, and wherein full autonomous control corresponds to SAE autonomous control level 5.

* * * * *